US011835664B2

United States Patent
Miura et al.

(10) Patent No.: US 11,835,664 B2
(45) Date of Patent: Dec. 5, 2023

(54) RADIATION IMAGING APPARATUS AND RADIATION IMAGING SYSTEM

(71) Applicant: CANON KABUSHIKI KAISHA, Tokyo (JP)

(72) Inventors: Ryosuke Miura, Chiba (JP); Tomoyuki Yagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 17/657,435

(22) Filed: Mar. 31, 2022

(65) Prior Publication Data
US 2022/0334269 A1  Oct. 20, 2022

(30) Foreign Application Priority Data
Apr. 15, 2021  (JP) ................. 2021-069264

(51) Int. Cl.
*G01T 1/17* (2006.01)
*G01T 1/02* (2006.01)

(52) U.S. Cl.
CPC . *G01T 1/17* (2013.01); *G01T 1/02* (2013.01)

(58) Field of Classification Search
CPC .. A61B 6/00; A61B 6/02; A61B 6/022; A61B 6/025; A61B 6/027; A61B 6/03; A61B 6/032; A61B 6/035; A61B 6/037; G01T 1/02; G01T 1/026; G01T 1/17; G01T 1/24; G01T 1/247; H04N 23/30;
(Continued)

(56) References Cited

U.S. PATENT DOCUMENTS

| 7,227,926 B2 | 6/2007 | Kameshima |
| 7,342,221 B2 | 3/2008 | Takenaka |

(Continued)

FOREIGN PATENT DOCUMENTS

| EP | 3 226 549 B1 | 5/2020 |
| EP | 3 661 190 A1 | 6/2020 |

(Continued)

OTHER PUBLICATIONS

U.S. Appl. No. 16/103,150, Atsushi Iwashita, filed Aug. 14, 2018.
(Continued)

*Primary Examiner* — John R Lee
(74) *Attorney, Agent, or Firm* — VENABLE LLP

(57) ABSTRACT

A radiation imaging apparatus executes a correction value determination operation of reading out a signal from a pixel once or more in a state where radiation is not emitted onto the apparatus, and determining a correction value that is based on the signal read out from the pixel, and a radiation dose determination operation of reading out a signal from the pixel while radiation is emitted, and determining a dose of radiation that is being emitted, using a value of the signal read out from the pixel and the correction value. The apparatus executes the correction value determination operation and executes the radiation dose determination operation using the correction value in a case where it is determined that the correction value determination operation is to be executed, and otherwise executes the radiation dose determination operation without executing the correction value determination operation.

15 Claims, 12 Drawing Sheets

(58) Field of Classification Search
CPC ........ H04N 25/30; H04N 5/32; H04N 5/3205; H04N 5/33; H04N 5/357; H04N 5/361; H04N 5/369
See application file for complete search history.

(56) References Cited

U.S. PATENT DOCUMENTS

| | | | |
|---|---|---|---|
| 7,343,000 B2 | 3/2008 | Kameshima |
| 7,381,963 B2 | 6/2008 | Endo |
| 7,386,089 B2 | 6/2008 | Endo |
| 7,403,594 B2 | 7/2008 | Endo |
| 7,408,167 B1 | 8/2008 | Kameshima |
| 7,421,063 B2 | 9/2008 | Takenaka |
| 7,442,939 B2 | 10/2008 | Yagi |
| 7,466,345 B2 | 12/2008 | Kameshima |
| 7,470,911 B2 | 12/2008 | Yagi |
| 7,476,027 B2 | 1/2009 | Takenaka |
| 7,491,960 B2 | 2/2009 | Takenaka |
| 7,514,663 B2 | 4/2009 | Yagi |
| 7,514,690 B2 | 4/2009 | Endo |
| 7,532,706 B2 | 5/2009 | Kameshima |
| 7,541,591 B2 | 6/2009 | Endo |
| 7,550,733 B2 | 6/2009 | Endo |
| 7,564,038 B2 | 7/2009 | Endo |
| 7,573,038 B2 | 8/2009 | Yokoyama |
| 7,573,041 B2 | 8/2009 | Kameshima |
| 7,613,277 B2 | 11/2009 | Takenaka |
| 7,629,587 B2 | 12/2009 | Yagi |
| 7,645,995 B2 | 1/2010 | Yagi |
| 7,683,337 B2 | 3/2010 | Takenaka |
| 7,696,484 B2 | 4/2010 | Yokoyama |
| 7,718,973 B2 | 5/2010 | Endo |
| 7,724,874 B2 | 5/2010 | Kameshima |
| 7,732,776 B2 | 6/2010 | Takenaka |
| 7,732,778 B2 | 6/2010 | Yokoyama |
| 7,750,309 B2 | 7/2010 | Endo |
| 7,786,448 B2 | 8/2010 | Endo |
| 7,791,034 B2 | 9/2010 | Kameshima |
| 7,791,035 B2 | 9/2010 | Yokoyama |
| 7,839,977 B2 | 11/2010 | Kameshima |
| 7,847,263 B2 | 12/2010 | Yagi |
| 7,850,367 B2 | 12/2010 | Takenaka |
| 7,869,568 B2 | 1/2011 | Yokoyama |
| 7,872,218 B2 | 1/2011 | Endo |
| 7,880,145 B2 | 2/2011 | Yagi |
| 7,965,817 B2 | 6/2011 | Kameshima |
| 7,989,772 B2 | 8/2011 | Yagi |
| 7,994,481 B2 | 8/2011 | Yagi |
| 8,072,514 B2 | 12/2011 | Takenaka |
| 8,093,562 B2 | 1/2012 | Yokoyama |
| 8,107,588 B2 | 1/2012 | Kameshima |
| 8,167,486 B2 | 5/2012 | Takenaka |
| 8,222,611 B2 | 7/2012 | Yagi |
| 8,247,779 B2 | 8/2012 | Kameshima |
| 8,576,294 B2 | 11/2013 | Kameshima |
| 8,723,996 B2 | 5/2014 | Yokoyama |
| 8,792,024 B2 | 7/2014 | Takenaka |
| 8,809,795 B2 | 8/2014 | Takenaka |
| 8,829,438 B2 | 9/2014 | Sato |
| 9,048,154 B2 | 6/2015 | Takenaka |
| 9,128,196 B2 | 9/2015 | Sato |
| 9,134,432 B2 | 9/2015 | Iwashita |
| 9,234,966 B2 | 1/2016 | Sugawara |
| 9,423,512 B2 | 8/2016 | Sato |
| 9,445,030 B2 | 9/2016 | Yagi |
| 9,462,989 B2 | 10/2016 | Takenaka |
| 9,468,414 B2 | 10/2016 | Ryu |
| 9,470,800 B2 | 10/2016 | Iwashita |
| 9,470,802 B2 | 10/2016 | Okada |
| 9,541,653 B2 | 1/2017 | Iwashita |
| 9,655,586 B2 | 5/2017 | Yagi |
| 9,737,271 B2 | 8/2017 | Iwashita |
| 9,812,474 B2 | 11/2017 | Yagi |
| 9,971,046 B2 | 5/2018 | Ryu |
| 9,980,685 B2 | 5/2018 | Iwashita |
| 9,989,656 B2 | 6/2018 | Sato |
| 10,009,990 B2 | 6/2018 | Takenaka |
| 10,349,914 B2 | 7/2019 | Takenaka |
| 10,416,323 B2 | 9/2019 | Ryu |
| 10,551,721 B2 | 2/2020 | Sato |
| 10,716,522 B2 | 7/2020 | Sato |
| 11,009,613 B2 * | 5/2021 | Zhang .................... H04N 25/63 |
| 11,047,995 B2 | 6/2021 | Yagi |
| 11,128,820 B2 | 9/2021 | Tamura |
| 11,243,314 B2 * | 2/2022 | Fujiyoshi ................. H04N 5/32 |
| 11,294,078 B2 | 4/2022 | Miura |
| 11,402,518 B2 | 8/2022 | Ryu |
| 2005/0161610 A1 | 7/2005 | Spahn |
| 2008/0237507 A1 | 10/2008 | Enomoto |
| 2010/0148080 A1 | 6/2010 | Endo |
| 2011/0317054 A1 | 12/2011 | Kameshima |
| 2014/0010353 A1 | 1/2014 | Lalena |
| 2014/0061491 A1 * | 3/2014 | Iwashita ............... H04N 25/767 |
| | | | 250/394 |
| 2014/0239186 A1 | 8/2014 | Sato |
| 2014/0361189 A1 | 12/2014 | Kameshima |
| 2016/0183908 A1 | 6/2016 | Hayashida |
| 2017/0285189 A1 * | 10/2017 | Ryu ....................... H04N 25/63 |
| 2018/0063933 A1 | 3/2018 | Okada |
| 2019/0293811 A1 * | 9/2019 | Zhang ..................... H04N 5/32 |
| 2020/0049838 A1 * | 2/2020 | Matsumoto ........... H04N 23/70 |
| 2020/0166659 A1 * | 5/2020 | Fujiyoshi ............. H04N 25/633 |
| 2020/0348424 A1 | 11/2020 | Watanabe |
| 2021/0011176 A1 | 1/2021 | Ishinari |
| 2022/0334269 A1 * | 10/2022 | Miura .................... H04N 25/63 |

FOREIGN PATENT DOCUMENTS

| | | |
|---|---|---|
| JP | 2020-89714 A | 6/2020 |
| WO | 2010/004776 A1 | 1/2010 |

OTHER PUBLICATIONS

U.S. Appl. No. 17/663,540, Hiroto Ueno, filed May 16, 2022.
U.S. Appl. No. 17/808,170, Takuya Ryu, filed Jun. 22, 2022.

* cited by examiner

RADIATION IMAGING APPARATUS AND RADIATION IMAGING SYSTEM

BACKGROUND OF THE INVENTION

Field of the Invention

The present invention relates to a radiation imaging apparatus and a radiation imaging system.

Description of the Related Art

There are known radiation imaging apparatuses that have the automatic exposure control (AEC) function. Such radiation imaging apparatuses can measure the dose of radiation that is being emitted, and end irradiation in accordance with the measurement result. The radiation imaging apparatuses monitor the radiation dose, for example, by operating only pixels set for detecting radiation at a high speed during irradiation. In addition, the radiation imaging apparatuses perform a reset operation for sequentially operating pixels in order to reset dark electric charges accumulated in the pixels, until a request to start irradiation is received. Japanese Patent Laid-Open No. 2020-089714 describes a radiation imaging apparatus that obtains a dose of radiation emitted to pixels for detecting radiation before receiving an irradiation start request, and determines a correction value that is used for AEC based on this radiation dose.

SUMMARY OF THE INVENTION

The radiation imaging apparatus in Japanese Patent Laid-Open No. 2020-089714 determines a correction value immediately before radiation is emitted, in order to improve the accuracy of AEC. However, irradiation cannot be received while an operation of determining a correction value is being executed, which affects a timing when image capturing can be started. An aspect of this disclosure provides a technique for decreasing the influence from an operation of determining a correction value that is used for monitoring a dose of radiation that is being emitted, on a timing for image capturing.

According to an aspect, a radiation imaging apparatus comprises: a plurality of pixels that include a first pixel; and a control unit configured to execute: a correction value determination operation of reading out a signal from the first pixel once or more in a state where radiation is not emitted onto the radiation imaging apparatus, and determining a correction value that is based on the signal read out from the first pixel, and a radiation dose determination operation of reading out a signal from the first pixel while radiation is emitted onto the radiation imaging apparatus, and determining a dose of radiation that is being emitted, using a value of the signal read out from the first pixel and the correction value. The control unit determines whether or not to execute the correction value determination operation, executes the correction value determination operation and executes the radiation dose determination operation using the correction value determined in the correction value determination operation in a case where it is determined that the correction value determination operation is to be executed, and executes the radiation dose determination operation without executing the correction value determination operation in a case where it is determined that the correction value determination operation is not to be executed.

Further features of the present invention will become apparent from the following description of exemplary embodiments with reference to the attached drawings.

DESCRIPTION OF THE EMBODIMENTS

Figure 1:
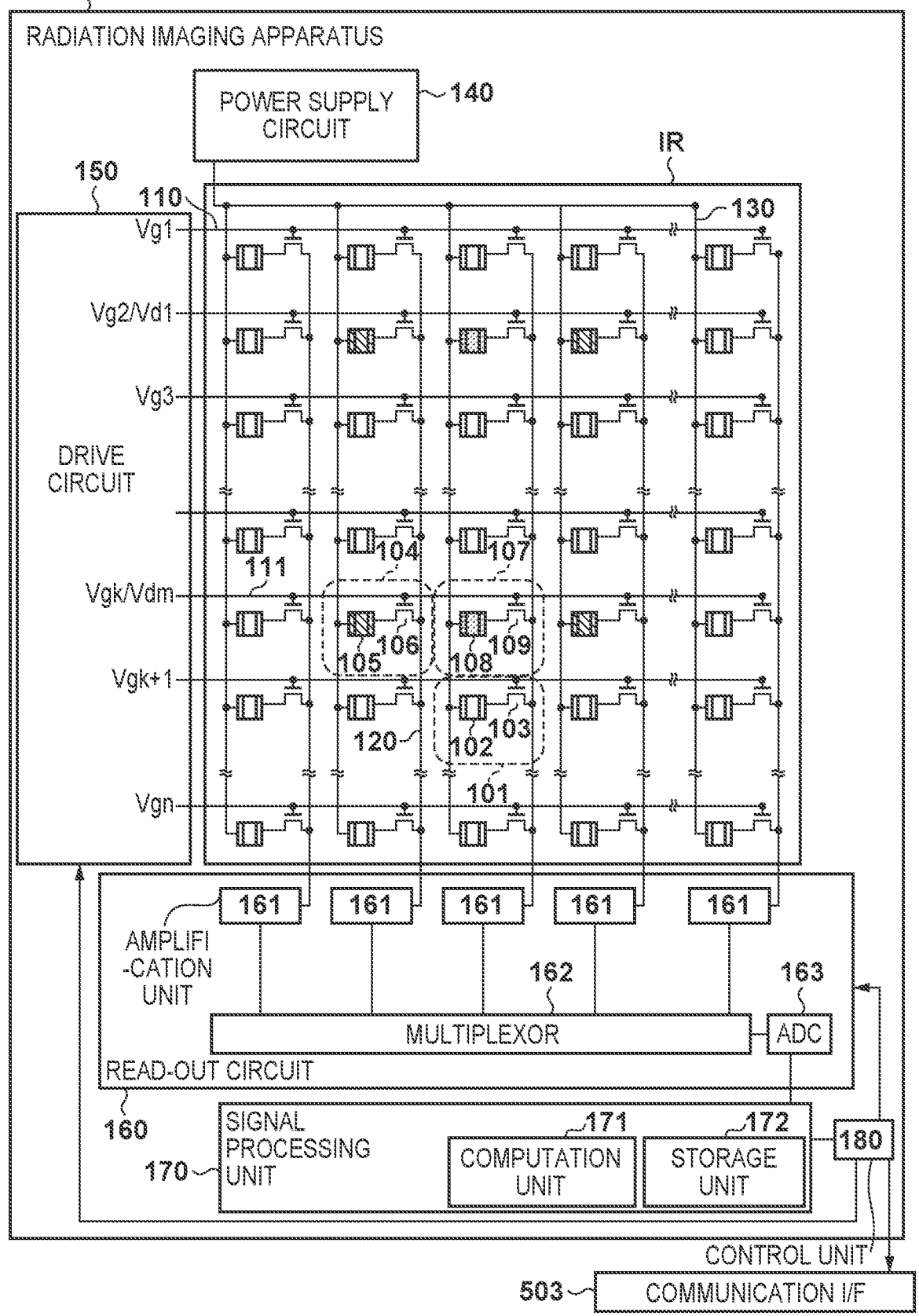
FIG. 1 is a diagram showing a configuration of a radiation imaging apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 shows a configuration example of a radiation imaging apparatus 100 according to a first embodiment of this disclosure. The radiation imaging apparatus 100 includes a plurality of pixels arranged in an image capturing region IR so as to form a plurality of rows and a plurality of columns, a plurality of drive lines 110, and a plurality of signal lines 120. The plurality of drive lines 110 are arranged in correspondence with the plurality of rows of pixels, and each of the drive lines 110 corresponds to one of the pixel rows. The plurality of signal lines 120 are arranged in correspondence with the plurality of columns of pixels, and each of the signal lines 120 corresponds to one of the pixel columns.

The plurality of pixels include a plurality of image capturing pixels 101 that are used for obtaining a radiation image, at least one detection pixel 104 that is used for monitoring an irradiation dose, and at least one correction pixel 107 that is used for correcting an irradiation dose. The sensitivity of the correction pixel 107 to radiation is lower than the sensitivity of the detection pixel 104 to radiation.

Each image capturing pixel 101 includes a conversion element 102 for converting radiation into an electrical signal, and a switch element 103 for connecting a corresponding signal line 120 and the conversion element 102. The detection pixel 104 includes a conversion element 105 for converting radiation into an electrical signal, and a switch element 106 for connecting a corresponding signal line 120 and the conversion element 105 to each other. The detection pixel 104 is disposed so as to be included in a row and a column that each include a plurality of image capturing pixels 101. The correction pixel 107 includes a conversion element 108 for converting radiation into an electrical signal, and a switch element 109 for connecting the signal line 120 and the conversion element 108 to each other. The correction pixel 107 is disposed so as to be included in a row and a column that each include a plurality of image capturing pixels 101. In FIG. 1 and subsequent figures, the image capturing pixels 101, the detection pixel 104, and the correction pixel 107 are distinguished from each other by applying different hatchings to the conversion elements 102, the conversion element 105, and the switch element 108.

Each conversion element 102, the conversion element 105, and the conversion element 108 may be each constituted by a scintillator for converting radiation into light and a photoelectric conversion element for converting light into an electrical signal. Usually, a scintillator is formed in a sheet-like shape to cover the image capturing region IR, and is shared by a plurality of pixels. Instead, the conversion element 102, the conversion element 105, and the conversion element 108 may be constituted by a conversion element for directly converting radiation into an electrical signal.

The switch element 103, the switch element 106, and the switch element 109 may each include a thin-film transistor (TFT) in which an active region is made of a semiconductor of amorphous silicon, polycrystalline silicon, or the like.

A first electrode of the conversion element 102 is connected to a first main electrode of the switch element 103, and a second electrode of the conversion element 102 is connected to a bias line 130. One bias line 130 extends in the column direction, and is connected to the second electrodes of a plurality of conversion elements 102 arranged in the column direction and is shared therebetween. The bias line 130 receives a bias voltage Vs from a power supply circuit 140. The second main electrodes of the switch elements 103 of one or more image capturing pixels 101 included in one column are connected to one signal line 120. Control electrodes of the switch elements 103 of one or more image capturing pixels 101 included in one row are connected to one drive line 110.

The detection pixel 104 and the correction pixel 107 have pixel configurations similar to that of an image capturing pixel 101, and are each connected to a corresponding drive line 110 and a corresponding signal line 120. The detection pixel 104 and the correction pixel 107 are exclusively connected to a signal line 120. That is to say, the correction pixel 107 is not connected to a signal line 120 to which the detection pixel 104 is connected. Also, the detection pixel 104 is not connected to a signal line 120 to which the correction pixel 107 is connected. An image capturing pixel 101 may be connected to a signal line 120 to which a detection pixel 104 or a correction pixel 107 is connected.

A drive circuit 150 is configured to supply a drive signal to pixels to be driven, through a plurality of drive lines 110 in accordance with a control signal from a control unit 180. In this embodiment, a drive signal is a signal for switching on a switch element included in a pixel to be driven. The switch element of each pixel is switched on by a high-level signal, and is switched off by a low-level signal. For this reason, this high-level signal is referred to as a drive signal. By a pixel being supplied with a drive signal, a signal accumulated in the conversion element of this pixel can be read out by a read-out circuit 160. If a drive line 110 is connected to at least one of the detection pixel 104 and the correction pixel 107, the drive line 110 is referred to as a "detection drive line 111".

The read-out circuit 160 is configured to read out signals from a plurality of pixels through a plurality of signal lines 120. The read-out circuit 160 includes a plurality of amplification units 161, a multiplexor 162, and an analog-digital converter (hereinafter, an "A/D converter") 163. Each of the plurality of signal lines 120 is connected to a corresponding amplification unit 161 from among the plurality of amplification units 161 of the read-out circuit 160. One signal line 120 corresponds to one amplification unit 161. The multiplexor 162 selects a plurality of amplification units 161 in a predetermined order, and supplies signals from the selected amplification units 161 to the A/D converter 163. The A/D converter 163 converts the supplied signals into digital signals and outputs the digital signals.

A signal read out from an image capturing pixel 101 is supplied to a signal processing unit 170, and is subjected to processing such as computation and storing performed by the signal processing unit 170. Specifically, the signal processing unit 170 includes a computation unit 171 and a storage unit 172, and the computation unit 171 generates a radiation image based on signals read out from the image capturing pixels 101, and supplies the radiation image to the control unit 180. Signals read out from the detection pixel 104 and the correction pixel 107 are supplied to the signal processing unit 170, and are subjected to processing such as computation and storing performed by the computation unit 171. Specifically, the signal processing unit 170 outputs information indicating irradiation on the radiation imaging apparatus 100, based on signals read out from the detection pixel 104 and the correction pixel 107. The signal processing unit 170 detects irradiation on the radiation imaging apparatus 100, and determines an irradiation dose and/or an integrated irradiation dose, for example.

The control unit 180 controls the drive circuit 150 and the read-out circuit 160 based on information from the signal processing unit 170. The control unit 180 controls start and end of exposure (accumulation of electric charges corresponding to radiation emitted from the image capturing pixels 101) based on information from the signal processing unit 170, for example.

In order to determine an irradiation dose, the control unit 180 scans only the detection drive lines 111 by controlling the drive circuit 150 such that only signals can be read out from the detection pixel 104 and the correction pixel 107. Next, the control unit 180 reads out signals of columns corresponding to the detection pixel 104 and the correction pixel 107 by controlling the read-out circuit 160, and outputs the signals as information indicating an irradiation dose. Due to such an operation, the radiation imaging apparatus 100 can obtain irradiation information in the detection pixel 104 during irradiation.

Figure 2:
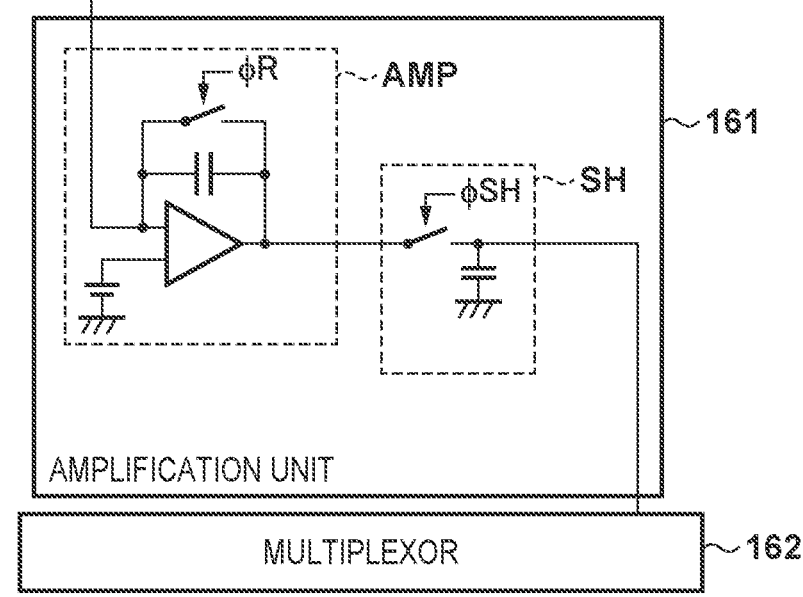
FIG. 2 is a diagram showing a configuration of an amplification unit according to the first embodiment.

FIG. 2 shows a detailed example of the circuit configuration of each amplification unit 161. The amplification unit 161 includes a differential amplifier circuit AMP and a sample hold circuit SH. The differential amplifier circuit AMP amplifies and outputs a signal appeared on a signal line 120. The control unit 180 can reset the potential of a signal line 120 by supplying a control signal φR to a switch element of the differential amplifier circuit AMP. Output from the differential amplifier circuit AMP can be held in the sample hold circuit SH. The control unit 180 causes the sample hold circuit SH to hold a signal by supplying a control signal φSH to a switch element of the sample hold circuit SH. The signal held in the sample hold circuit SH is read out by the multiplexor 162.

Figure 3:
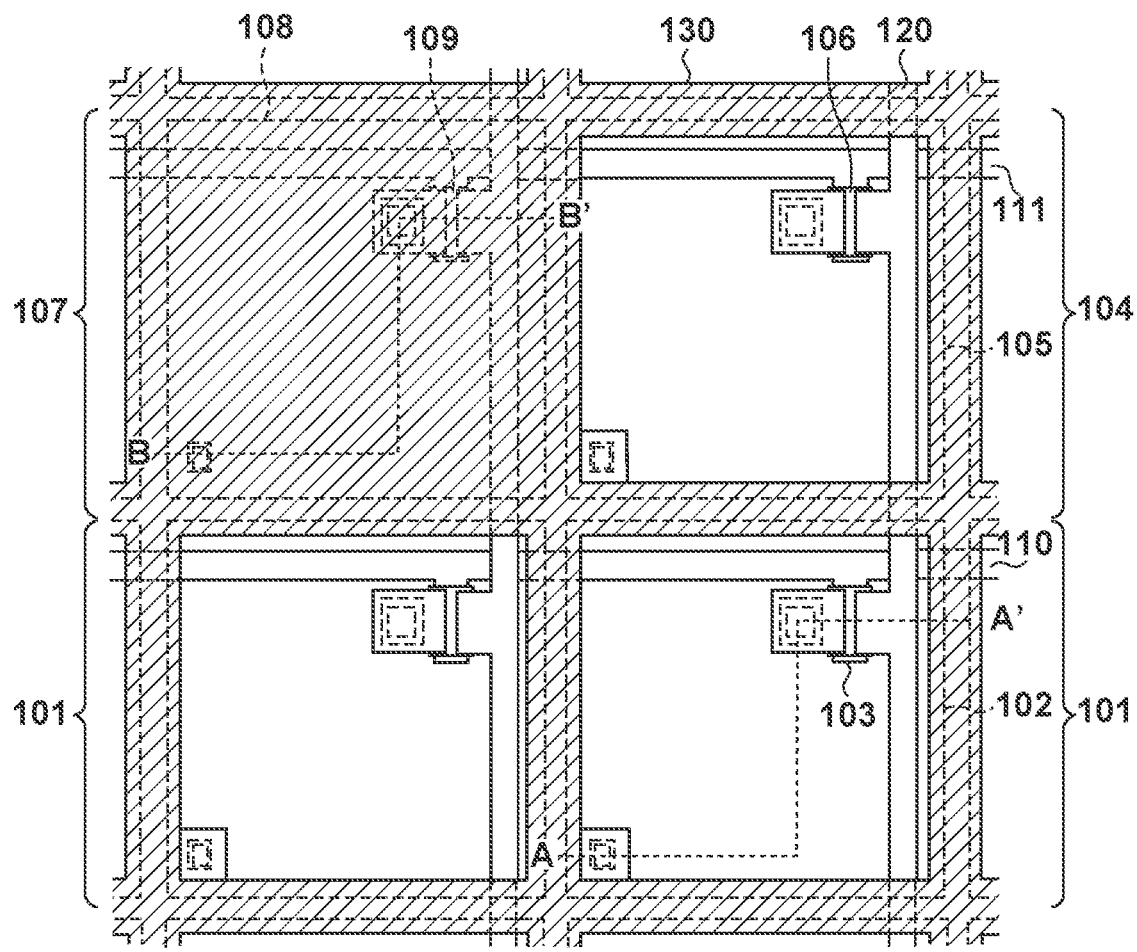
FIG. 3 is a plan view showing configurations of pixels according to the first embodiment.

A structure example of pixels of the radiation imaging apparatus 100 will be described with reference to FIGS. 3 to 4B. FIG. 3 is a plan view showing configurations of image capturing pixels 101, the detection pixel 104, and the correction pixel 107 in the radiation imaging apparatus 100. The plan view is equivalent to orthographic projection onto a plane parallel to the image capturing region IR of the radiation imaging apparatus 100. As indicated by hatching, a metal layer is disposed on the conversion element 108 of the correction pixel 107, and the conversion element 108 is shielded from light due to this metal layer.

Figure 4A:
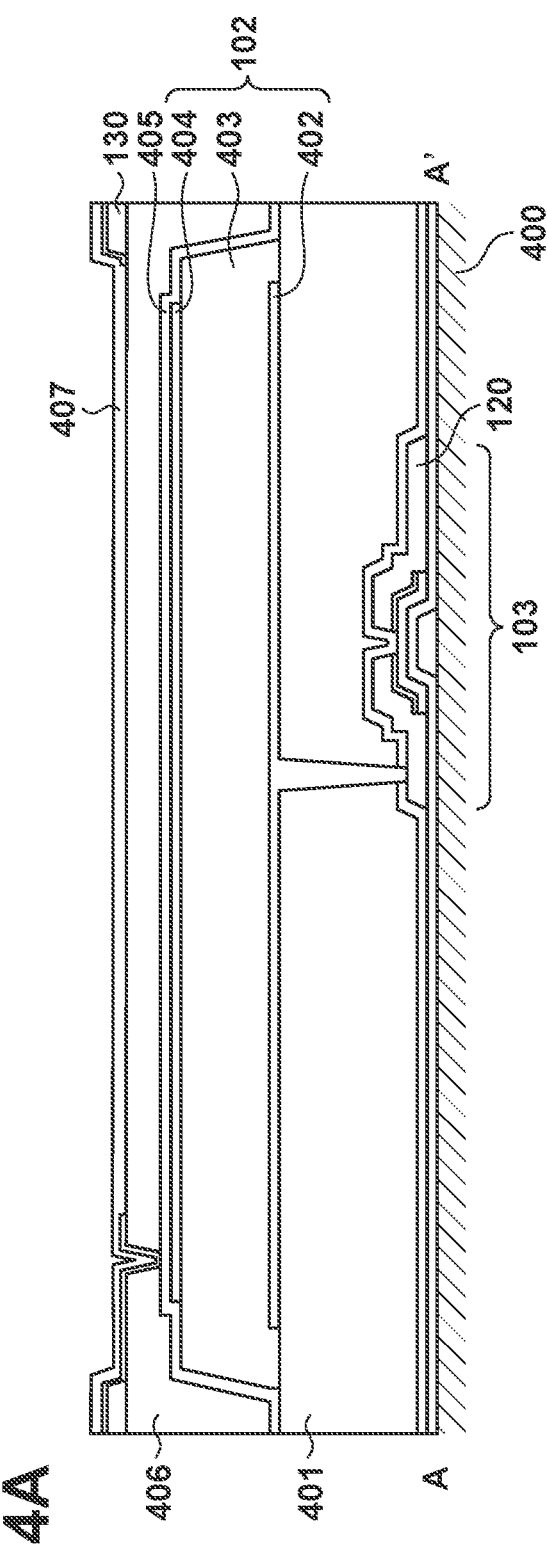
FIGS. 4A and 4B are cross-sectional views showing configurations of pixels according to the first embodiment.

FIG. 4A is a cross-sectional view of the image capturing pixel 101 taken along the line A-A' in FIG. 3. The cross-sectional view of the detection pixel 104 is similar to the cross-sectional view of the image capturing pixel 101. The switch element 103 is disposed on an insulative supporting substrate 400 such as a glass substrate. The switch element 103 may be a TFT (thin-film transistor). An intermediate insulation layer 401 is disposed on the switch element 103. The conversion element 102 is disposed on the intermediate insulation layer 401. This conversion element 102 is a photoelectric conversion element that can convert light into an electrical signal. The conversion element 102 is constituted by an electrode 402, a PIN photodiode 403, and an electrode 404, for example. The conversion element 102 may also be constituted by an MIS sensor in place of a PIN photodiode.

A protection film 405, an intermediate insulation layer 406, the bias line 130, and a protection film 407 are arranged in order on the conversion element 102. A planarized film and a scintillator (not illustrated) are disposed on the protection film 407. The electrode 404 is connected to the bias line 130 via a contact hole. ITO that has optical transparency is used as the material of the electrode 404, which can transmit light obtained by the scintillator (not illustrated) converting radiation.

Figure 4B:
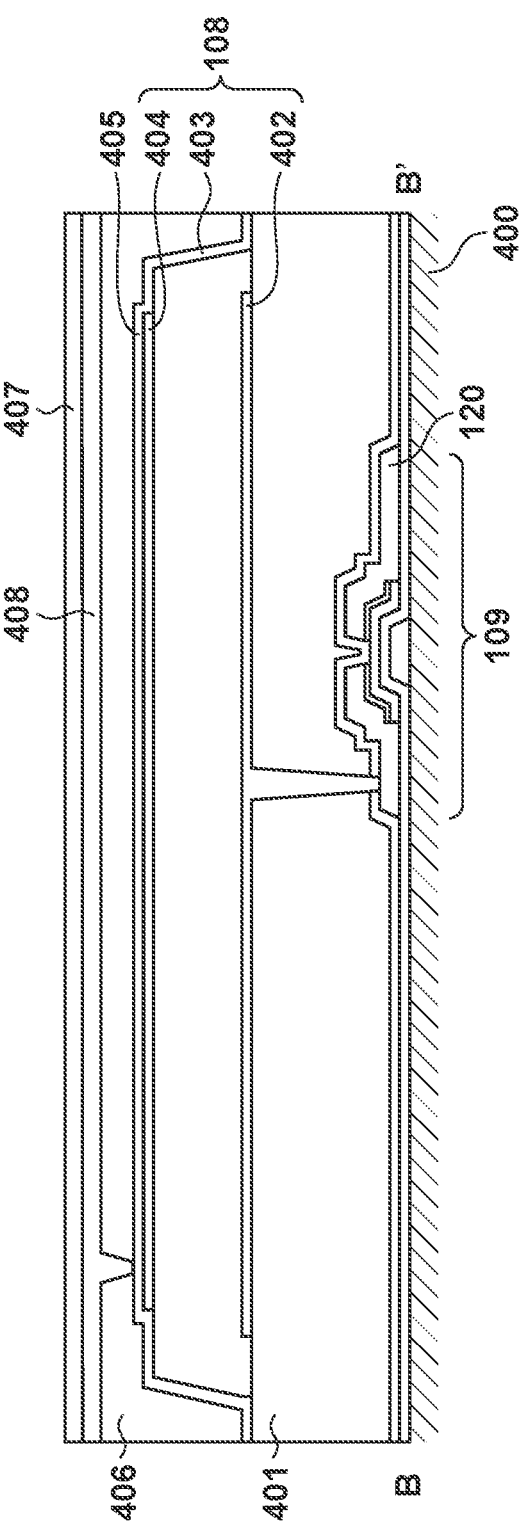

FIG. 4B is a cross-sectional view of the correction pixel 107 taken along the line B-B' in FIG. 3. The correction pixel 107 is different from the image capturing pixel 101 and the detection pixel 104 in that the conversion element 108 is covered by a light shielding member 408, and may be the same except for that. The light shielding member 408 is formed of a metal layer that is in the same layer as the bias line 130, for example. Since the conversion element 108 of the correction pixel 107 is covered by the light shielding member 408, the sensitivity of the correction pixel 107 to radiation is significantly low compared with those of the image capturing pixel 101 and the detection pixel 104. It is possible to say that electric charges accumulated on the conversion element 108 of the correction pixel 107 are not caused due to radiation.

Figure 5:
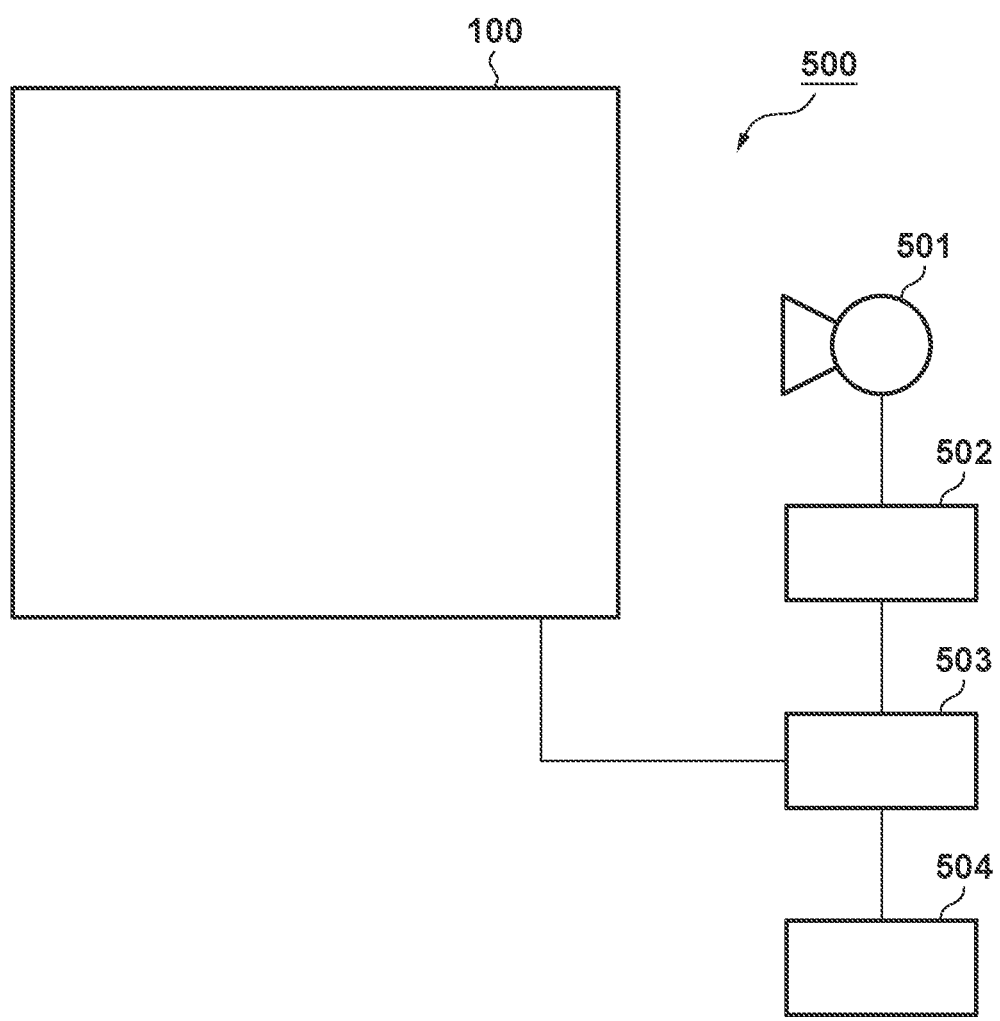
FIG. 5 is a diagram showing a configuration example of a radiation imaging system that includes the radiation imaging apparatus.

FIG. 5 shows a configuration example of a radiation imaging system 500 that includes the radiation imaging apparatus 100. The radiation imaging system 500 includes the radiation imaging apparatus 100, a radiation source 501, a radiation source interface 502, a communication interface 503, and a controller 504.

A radiation dose, an upper limit of irradiation time (ms), a tube current (mA), a tube voltage (kV), a region of interest (ROI) that is a region in which radiation is to be monitored, and the like are input to the controller 504. When an operation is performed on an exposure switch attached to the radiation source 501, the controller 504 transmits a start request signal to the radiation imaging apparatus 100. The start request signal is a signal for requesting that irradiation is to be started. The radiation imaging apparatus 100 starts preparing for receiving irradiation in accordance with the start request signal being received. When preparation is made, the radiation imaging apparatus 100 transmits a ready-to-start signal to the radiation source interface 502 via the communication interface 503. The ready-to-start signal is a signal for performing notification that irradiation can be started. The radiation source interface 502 causes the radiation source 501 to start irradiation, in accordance with the ready-to-start signal being received.

When a threshold of the integration value of doses of emitted radiation is reached, the radiation imaging apparatus 100 transmits an end request signal to the radiation source interface 502 via the communication interface 503. The end request signal is a signal for requesting that irradiation is to be ended. The radiation source interface 502 causes the radiation source 501 to end irradiation in accordance with the end request signal being received. The radiation dose threshold is determined by the control unit 180 based on an input value of a radiation dose, an irradiation intensity, communication delay between units, processing delay, and the like. When the irradiation time reaches an upper limit of irradiation time that has been input, the radiation source 501 stops irradiation, even when the end request signal has not been received.

After irradiation has been stopped, the radiation imaging apparatus 100 sequentially scans drive lines 110 to which only image capturing pixels 101 are connected (drive lines 110 other than the detection drive lines 111), and obtains a radiation image by the read-out circuit 160 reading out image signals of the image capturing pixels 101. Since the electric charges accumulated in the detection pixel 104 were read out during irradiation and the correction pixel 107 is shielded from light, signals from these pixels cannot be used for forming a radiation image. In view of this, the signal processing unit 170 of the radiation imaging apparatus 100 interpolates pixel values at the positions of these pixels by performing interpolation processing using the pixel values of image capturing pixels 101 around the detection pixel 104 and the correction pixel 107.

Figure 6:
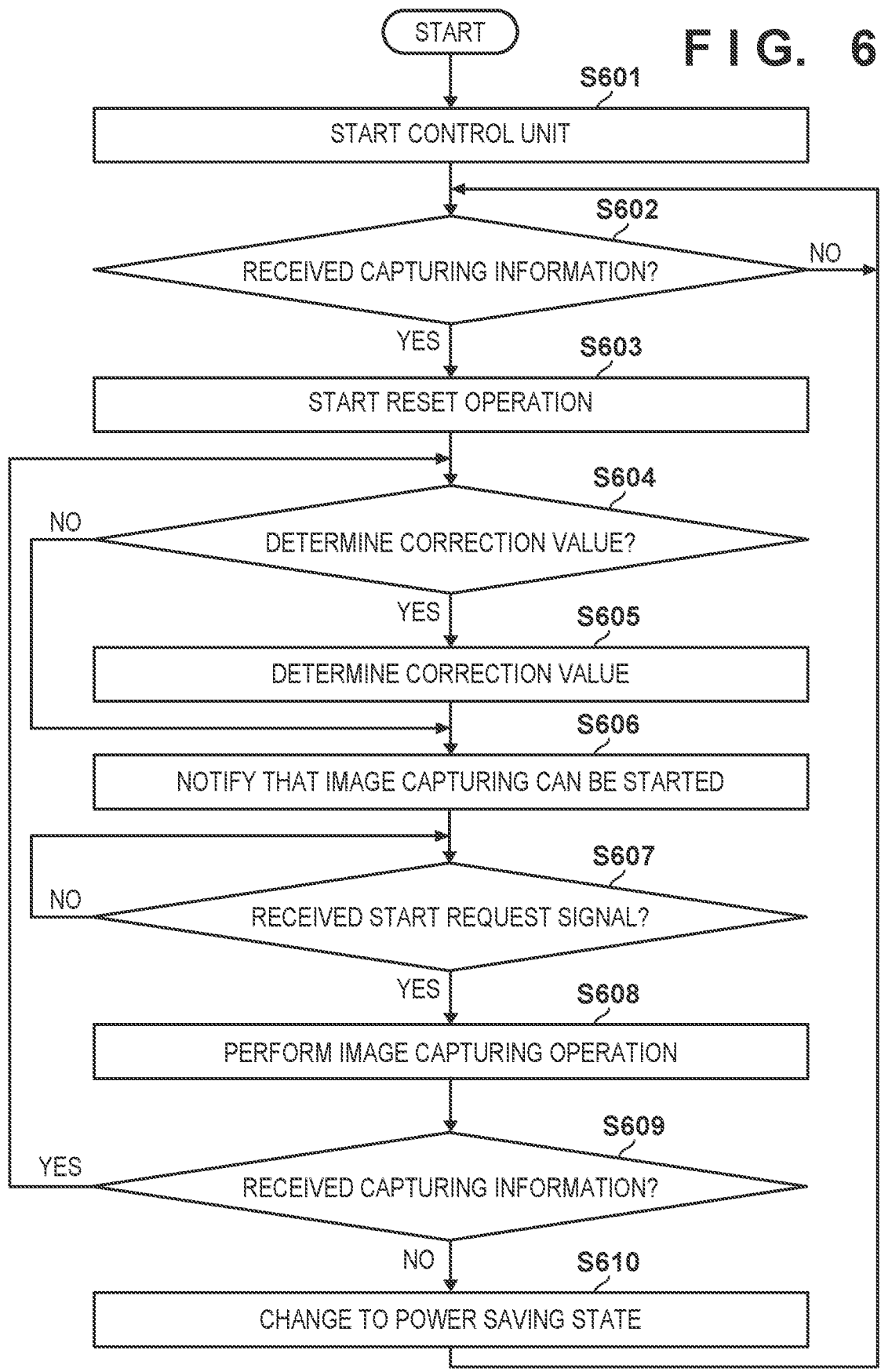
FIG. 6 is a flowchart showing operations of the radiation imaging apparatus according to the first embodiment.

An operation example of the radiation imaging apparatus 100 will be described with reference to FIG. 6. This operation is executed by the control unit 180. The control unit 180 may be constituted by a general-purpose processing circuit such as a microprocessor, or may be constituted by a dedicated processing circuit such as an Application Specific Integrated Circuit (ASIC). If the control unit 180 is constituted by a general-purpose processing circuit, the control unit 180 may further include a memory, and the processing in FIG. 6 may be performed by the general-purpose processing circuit executing a program stored in a memory. The operation in FIG. 6 is started when the power supply of the radiation imaging apparatus 100 is off.

In step S601, the control unit 180 starts the radiation imaging apparatus 100 in a power saving state in accordance with the power supply of the radiation imaging apparatus 100 being switched on. In the power saving state, the control unit 180 can communicate with another apparatus such as the radiation source 501 or the controller 504 via the communication interface 503. In the power saving state, operation power does not need to be supplied to constituent elements other than the control unit 180 such as the drive circuit 150, the pixels in the image capturing region IR, the readout circuit 160, and the signal processing unit 170.

In step S602, the control unit 180 determines whether or not image capturing information has been received from an external apparatus. The image capturing information is transmitted from the controller 504 to the radiation imaging apparatus 100, for example. The image capturing information may include information regarding image capturing such as gain settings of the radiation imaging apparatus 100. If image capturing information has been received (YES in step S602), the procedure transitions to step S603, otherwise (NO in step S602) the procedure repeats step S602. In this manner, the radiation imaging apparatus 100 is kept in the power saving state until image capturing information is received.

In step S603, the control unit 180 starts a reset operation of a plurality of pixels. The reset operation is an operation of removing electric charges accumulated on the conversion elements of pixels, or specifically, an operation of electrically connecting the switch elements of pixels by supplying a drive signal to the drive lines 110. Therefore, the control unit 180 exits the power saving state in order to perform the reset operation. The reset operation is repeatedly performed on the pixel rows until a different and subsequent operation is started.

In step S604, the control unit 180 determines whether or not to execute an operation of determining a correction value that is used for correcting a signal read out from the detection pixel 104 (hereinafter, referred to as a "correction value determination operation") in order to execute AEC. If it is determined that the correction value determination operation is to be executed (YES in step S604), the procedure transitions to step S605, and the control unit 180 ends the reset operation and executes the correction value determination operation. A specific method of the correction value determination operation will be described later. After the correction value determination operation has ended, the control unit 180 notifies, via the communication interface 503, the controller 504 that image capturing can be started, in step S606. After the correction value determination operation has ended, the control unit 180 may resume the reset operation. The correction value determination operation is executed in a state where radiation is not emitted onto the radiation imaging apparatus 100.

If it is determined in step S604 that the correction value determination operation is not to be executed (NO in step S604), the procedure transitions to step S606, and the control unit 180 notifies, via the communication interface 503, the controller 504 that image capturing can be started, without executing the correction value determination operation. In this case, a configuration may be adopted in which the control unit 180 repeats the reset operation until an image capturing region IR is stabilized, and then performs this notification.

Determination criteria for determining in step S604 that the correction value determination operation is to be executed will be described. The determination criteria may include a criterion regarding a parameter that affects a correction value. The determination criteria may include, for example, a criterion regarding a time that has lapsed from when the correction value determination operation was lastly executed. The determination criteria may include, for example, a predetermined time (for example, three days) having elapsed from when the correction value determination operation was lastly executed. Alternatively or in addition, the determination criteria may include a criterion regarding the internal temperature of the radiation imaging apparatus 100. The determination criteria may include, for example, the internal temperature at a time point when step S604 is executed being out of a predetermined range (for example, being different by 2% or more) from the internal temperature of the radiation imaging apparatus 100 when the correction value determination operation was executed in the past (for example, lastly).

The determination criteria may include a criterion regarding offset output of the detection pixel 104 and the correction pixel 107. The determination criteria may include, for example, the offset output at a time point when step S604 is performed being out of a predetermined range (for example, being different by 2% or more) from offset output of these pixels when the correction value determination operation was executed in the past (for example, lastly). The control unit 180 may directly determine offset output of the detection pixel 104 and the correction pixel 107 based on signals read out from the detection pixel 104 and the correction pixel 107. Alternatively, the control unit 180 may indirectly determine offset output of the detection pixel 104 and the correction pixel 107 by performing inference based on output that is correlated to the offset output. The above-described determination criteria may be determined and stored in the storage unit 172 at the time of manufacturing. Furthermore, the user of the radiation imaging apparatus 100 may be able to update or generate the determination criteria.

In step S607, the control unit 180 determines whether or not a start request signal has been received. The start request signal is transmitted from the controller 504, for example. If a start request signal has been received (YES in step S607), the procedure transitions to step S608, otherwise (NO in step S607), the procedure repeats step S607. The control unit 180 continues the reset operation until a start request signal is received.

In step S608, the control unit 180 performs an image capturing operation using the image capturing information received in step S602. Radiation is emitted onto the radiation imaging apparatus 100 during the image capturing operation. While radiation is being emitted onto the radiation imaging apparatus 100, the control unit 180 reads out signals from the detection pixel 104 and the correction pixel 107, and executes an operation of determining the dose of radiation that is being emitted (hereinafter, referred to as a radiation dose determination operation) using the values of these signals and a correction value. If it is determined in step S604 that the correction value determination operation is to be executed, the control unit 180 uses the correction value determined in step S605, in the radiation dose determination operation. If it is determined in step S604 that the correction value determination operation is not to be executed, the control unit 180 may use the correction value determined in the previously executed correction value determination operation and stored in the storage unit 172, in the radiation dose determination operation. Alternatively, the control unit 180 may use the correction value stored in the storage unit 172 in advance (for example, at the time of manufacturing), in the radiation dose determination operation.

In step S609, the control unit 180 determines whether or not the next image capturing information has been received.

If the next image capturing information has been received (YES in step S609), the procedure transitions to step S604, and the control unit 180 determines whether or not to execute the correction value determination operation again. Otherwise (NO in step S609), the procedure transitions to step S610. In step S610, the control unit 180 changes the state of the radiation imaging apparatus 100 to the power saving state in which only the control unit 180 is operating.

When the correction value determination operation is executed in step S605, the control unit 180 cannot start image capturing until this operation ends. For this reason, it takes time until image capturing can be started (that is to say, until the radiation dose determination operation can be executed for the first time) after the radiation imaging apparatus 100 is started. In the above-described method, the correction value determination operation can be executed only when it is necessary, by determining in step S604 whether or not to execute the correction value determination operation. Accordingly, it is possible to shorten a time until image capturing can be started while decreasing the influence on the accuracy of AEC.

In the exemplary operation in FIG. 6, after the reset operation has been started in step S603, the control unit 180 determines in step S604 whether or not to execute the correction value determination operation. Alternatively, the control unit 180 may determine whether or not to execute the correction value determination operation, between the determination as to receiving of image capturing information in step S602 and start of the reset operation in step S603.

In the exemplary operation in FIG. 6, regardless of a type of image capturing, the control unit 180 determines in step S604 whether or not to execute the correction value determination operation. Alternatively, the control unit 180 may determine in step S604 whether or not to execute the correction value determination operation, only in a case of image capturing in which AEC is performed. In a case of image capturing in which AEC is not performed, the control unit 180 does not perform the determination in step S604, and does not need to perform the correction value determination operation. Accordingly, in a case of image capturing in which AEC is not performed, it is possible to shorten a time until image capturing can be started.

Figure 7:
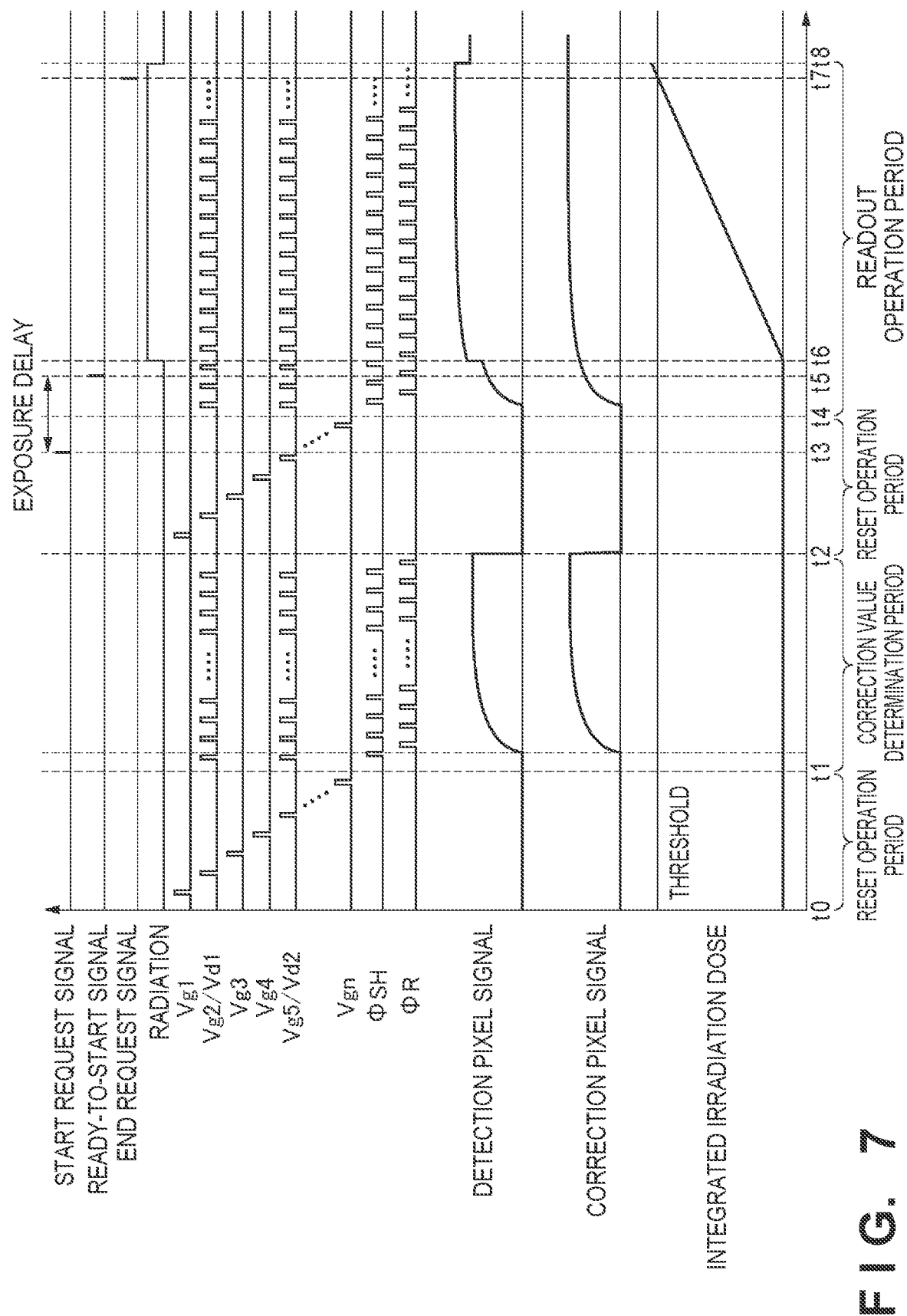
FIG. 7 is a timing diagram showing operations of the radiation imaging apparatus according to the first embodiment.

An exemplary operation of the radiation imaging apparatus 100 if it is determined in step S604 in FIG. 6 that the correction value determination operation is to be executed will be described with reference to FIG. 7. In FIG. 7, "radiation" indicates whether or not radiation is being emitted onto the radiation imaging apparatus 100. The radiation being low indicates that radiation is not being emitted, and radiation being high indicates that radiation is being emitted. "Vg1" to "Vgn" indicate drive signals that are supplied from the drive circuit 150 to the plurality of drive lines 110. "Vgk" corresponds to the drive line 110 on a kth row (k=1, . . . , or the total number of drive lines). As described above, a portion of the plurality of drive lines 110 is also referred to as a "detection drive line 111". The jth detection drive line 111 is indicated by "Vdj" (j=1, . . . , or the total number of detection drive lines). "φSH" indicates the level of a control signal that is supplied to the sample hold circuit SH of the amplification unit 161. "φR" indicates the level of a control signal that is supplied to the differential amplifier circuit AMP of the amplification unit 161. "Detection pixel signal" indicates the value of a signal read out from the detection pixel 104. "Correction pixel signal" indicates the value of a signal read out from the correction pixel 107. "Integrated irradiation dose" indicates the integration value of radiation emitted onto the radiation imaging apparatus 100. A method for determining this integration value will be described later.

At time t0 (corresponding to step S603 in FIG. 6), the control unit 180 starts the reset operation of a plurality of pixels. The control unit 180 resets the pixels connected to the drive line 110 on the first row by controlling the drive circuit 150. Subsequently, the control unit 180 resets the pixels connected to the drive line 110 on the second row. The control unit 180 repeats this operation to the drive line 110 on the last row. While repeating the reset operation, the control unit 180 determines that the correction value determination operation is to be executed.

At time t1 (corresponding to step S605 in FIG. 6), the control unit 180 performs a readout operation of reading out signals from the detection pixel 104 and the correction pixel 107 at least once, and determines a correction value. The readout operation is executed on the detection drive lines 111, and is not executed on the other drive lines 110. Specifically, the drive circuit 150 supplies a drive signal to the drive lines 110 connected to at least one of the detection pixel 104 and the correction pixel 107 (that is to say, the detection drive lines 111) from among the plurality of drive lines 110. However, the drive circuit 150 does not supply a drive signal to a drive line 110 that is not connected to any of the detection pixel 104 and the correction pixel 107 from among the plurality of drive lines 110. In addition, the drive circuit 150 supplies a drive signal to drive lines 110 connected to at least one of the detection pixel 104 and the correction pixel 107 from among the plurality of drive lines 110 at the same time. Accordingly, signals from a plurality of pixels connected to the signal lines 120 are joined and read out by the read-out circuit 160. The detection pixel 104 and the correction pixel 107 are exclusively connected to signal lines 120, and thus the read-out circuit 160 can separately read out signals of pixels that have different sensitivities.

In one readout operation, the control unit 180 temporarily supplies a drive signal to at least one detection drive line 111. The control unit 180 then holds, to the sample hold circuit SH, a signal read out by the read-out circuit 160 from a pixel through a signal line 120, by temporarily changing the control signal φSH to the high level. The control unit 180 then resets the read-out circuit 160 (specifically, the differential amplifier circuit AMP of the amplification unit 161 there), by temporarily changing the control signal φR to the high level. When a region of interest is set in the image capturing region IR, there is no need to read out a signal from a detection pixel 104 that is not included in this region of interest.

In order to determine a correction value, the control unit 180 performs the readout operation a predetermined number of times, that is once or more. The signal processing unit 170 determines a correction value Od that is based on a signal read out from the detection pixel 104 as a result of performing the readout operation the predetermined number of times, and a correction value Oc that is based on a signal read out from the correction pixel 107 as a result of performing the readout operation this predetermined number of times. Determination of the correction value Od will be described in detail. If the predetermined number of times is one, the number of signals that are read out from the detection pixel 104 is one, and thus the signal processing unit 170 specifies the value of this signal as the correction value Od. If the predetermined number of times is a plurality of times, the signal processing unit 170 specifies the average value of a plurality of read signals as the correction value Od. Another statistics value may be used instead of the average value. Based on a signal read out from the correction pixel 107, the correction value Oc is determined in a similar manner. The signal processing unit 170 stores the correction values Od and Oc determined in this manner to the storage unit 172 such that these correction values can be used for the following processing.

When the correction values are determined, the control unit 180 notifies the controller 504 that image capturing can be started, at time t2 (corresponding to step S606 in FIG. 6). After performing notification that image capturing can be started, the control unit 180 repeatedly executes the above-described reset operation.

As a result of determining the correction values Od and Oc before an irradiation start request signal is received in this manner, it is possible to prevent this determination operation from affecting exposure delay of radiation. For this reason, it is possible to increase the number of times the readout operation for determining the correction values Od and Oc is performed (for example, the readout operation is performed several thousand times). By averaging values obtained by performing the readout operation a plurality of times, it is possible to decrease the noise influence of the correction values Od and Oc, and to improve the correction accuracy.

At time t3 (corresponding to YES in step S607 in FIG. 6), the control unit 180 receives a start request signal from the controller 504. In accordance with a start request signal being received, the control unit 180 performs the reset operation to the last row, and ends the reset operation. The control unit 180 may end the reset operation before performing the reset operation to the last row, and transition to the next processing. If, for example, a start request signal is received during the reset operation of the drive line 110 on the kth row, the control unit 180 may transition to the next processing without performing the reset operation of drive lines 110 on k+1th row onward. In this case, unevenness that may occur in a radiation image may be reduced by adjusting driving for obtaining a radiation image and performing image processing of the radiation image.

At time t4, the control unit 180 starts an image capturing operation. Specifically, the control unit 180 starts a determination operation for determining the dose of radiation that is being emitted onto the radiation imaging apparatus 100 and an accumulation operation of causing electric charges accumulating in the image capturing pixels 101. In the determination operation, the control unit 180 repeatedly executes a readout operation of reading out signals from the detection pixel 104 and the correction pixel 107. The readout operation in the image capturing operation may be similar to the readout operation in the correction value determination operation, and thus a redundant description is omitted. The signal processing unit 170 measures an irradiation dose DOSE for each readout operation, and determines whether or not the integration value thereof exceeds a threshold. At time t5, the control unit 180 transmits a ready-to-start signal to the radiation source interface 502. Irradiation is started at time t6.

A method for determining the irradiation dose DOSE will be described below. The value of a signal read out from the detection pixel 104 in the last readout operation is indicated by Sd. The value of a signal read out from the correction pixel 107 in the last readout operation is indicated by Sc. The signal processing unit 170 calculates DOSE by applying Sd, Sc, Od, and Oc to Expression 1 below.

$$DOSE=(Sd-Od)-(Sc-Oc) \quad \text{Expression 1}$$

In this expression, DOSE is determined based on the difference between the value Sc of a signal read out from the correction pixel 107 after the ready-to-start signal was transmitted and the correction value Oc determined based on a signal read out from the correction pixel 107 before the ready-to-start signal is transmitted.

In addition, the signal processing unit 170 may also calculate DOSE by applying Sd, Sc, Od, and Oc to Expression 2 below, instead of Expression 1.

$$DOSE=Sd-Od\times Sc/Oc \quad \text{Expression 2}$$

In this expression, DOSE is determined based on the ratio of the value Sc of the signal read out from the correction pixel 107 after the ready-to-start signal was transmitted, to the correction value Oc determined based on the signal read out from the correction pixel 107 before the ready-to-start signal is transmitted.

In this embodiment, the irradiation dose DOSE is determined using the values of signals read out from the correction pixel 107 (Sc and Oc). It is conceivable that the sensitivity of the correction pixel 107 to radiation is very low, and thus the value Sc of a signal read out from the correction pixel 107 after irradiation was started represents an offset component of the value Sd of a signal read out from the detection pixel 104. Furthermore, in this embodiment, the irradiation dose DOSE is determined using the correction values Od and Oc that are based on signals read out from the detection pixel 104 and the correction pixel 107 before irradiation is started. Accordingly, it is possible to correct the difference between properties of pixels (difference between channels of detection circuit, differences in parasitic resistances and parasitic capacitance between pixels, etc.)

If the integrated irradiation dose reaches the threshold at time t7, the control unit 180 transmits an end request signal to the radiation source interface 502. Alternatively, the control unit 180 may estimate a time when the integrated irradiation dose will reach the threshold, and transmit the end request signal at this estimated time. At time t8, the radiation source interface 502 causes the radiation source 501 to end irradiation, in accordance with the end request signal being received.

Figure 8:
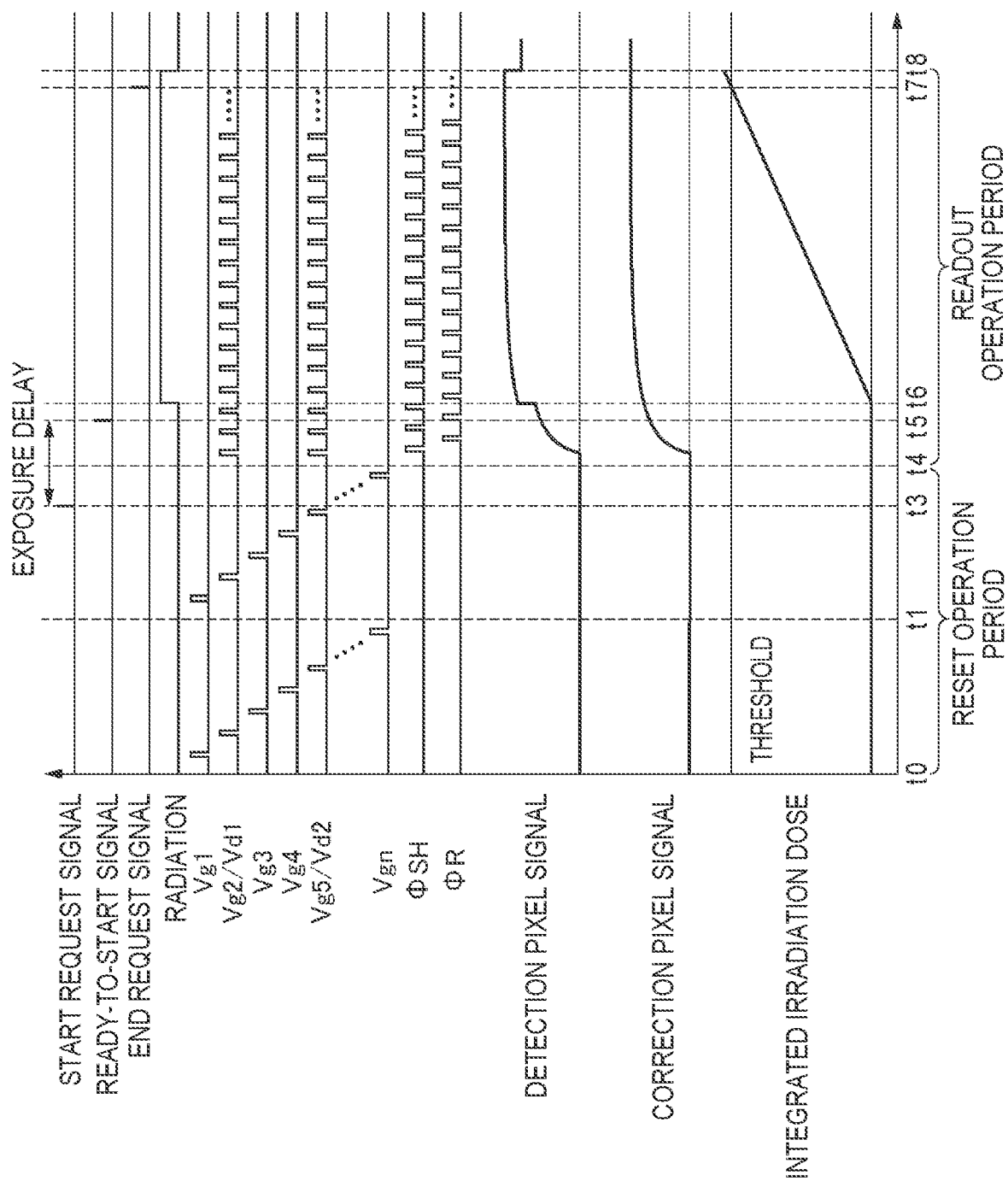
FIG. 8 is a timing diagram showing operations of the radiation imaging apparatus according to the first embodiment.

An exemplary operation of the radiation imaging apparatus 100 if it is determined in step S604 in FIG. 6 that the correction value determination operation is not to be executed will be described with reference to FIG. 8. At time t0 (corresponding to step S603 in FIG. 6), the control unit 180 starts a reset operation of a plurality of pixels. While the reset operation is being repeatedly performed, the control unit 180 determines that the correction value determination operation is not to be executed. In view of this, the control unit 180 notifies the controller 504 that image capturing can be started. The operation at time t3 and later is similar to the exemplary operation in FIG. 7. The irradiation dose DOSE is determined using the correction values Oc and Od determined previously and stored in the storage unit 172.

A configuration may also be adopted in which the control unit 180 stores correction values Od and Oc obtained at a plurality of timings and selects correction values Od and Oc that are used for correction based on information regarding an environment such as a temperature or information regarding a time that has lapsed from when the correction values were obtained. The control unit 180 monitors the temperature of the radiation imaging apparatus 100, and uses correction values Od and Oc obtained in a temperature environment that is close to a temperature environment at the time of radiation detection, for example. Accordingly, it is possible to suppress the influence of an offset component that changes according to a temperature. Alternatively, the control unit 180 may further improve the correction accuracy by using the average value of a plurality of correction values Od and Oc obtained in close temperature environments. In addition, for example, the control unit 180 records a period of time from when correction values Od and Oc were determined until when radiation is detected, and uses correction values Od and Oc for which a long time has not elapsed after determination, and thereby it is possible to suppress the influence of the offset component that changes over time. In addition, the control unit 180 can improve the correction accuracy by using the average value of a plurality of correction values Od and Oc for which a long time has not elapsed after determination.

Figure 9:
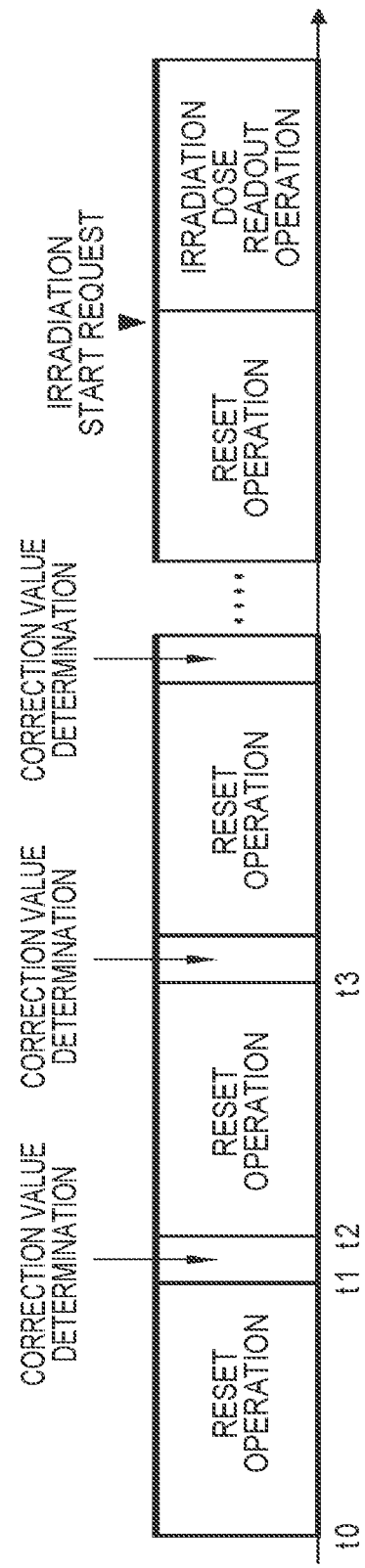
FIG. 9 is a diagram illustrating a timing for a correction value determination operation according to the first embodiment.

The readout operation for determining correction values Od and Oc may be performed in a separate manner as shown in FIG. 9 instead of being performed several thousand times at once. The control unit 180 determines correction values Od and Oc by executing the reset operation at time t0 and then executing the readout operation several hundred times at time t1, for example. The control unit 180 then executes the reset operation again at time t2, and then executes the readout operation, for example, several hundred times at time t3, thereby determining correction values Od and Oc. From this point on, the reset operation and the correction value determination operation are repeated in a similar manner. The control unit 180 determines correction values Od and Oc that are used for correction, by averaging a plurality of correction values Od and Oc determined in this manner. By performing the operation of determining the correction values Od and Oc in a separate manner as described above, a pair consisting a correction value Od and a correction value Oc can be determined at time t1, and the accuracy of correction values Od and Oc can be improved every time determination is made.

Second Embodiment

A radiation imaging apparatus according to a second embodiment will be described. The hardware configuration of the radiation imaging apparatus according to the second embodiment may be similar to that of the first embodiment. Thus, the radiation imaging apparatus according to the second embodiment is also referred to as the "radiation imaging apparatus 100". Operations of the radiation imaging apparatus 100 according to the second embodiment are different from those of the first embodiment. The second embodiment may be similar to the first embodiment except for that, and thus a redundant description is omitted. Differences from the first embodiment will be described below, but the same change may be made in the second embodiment or the third embodiment.

Figure 10:
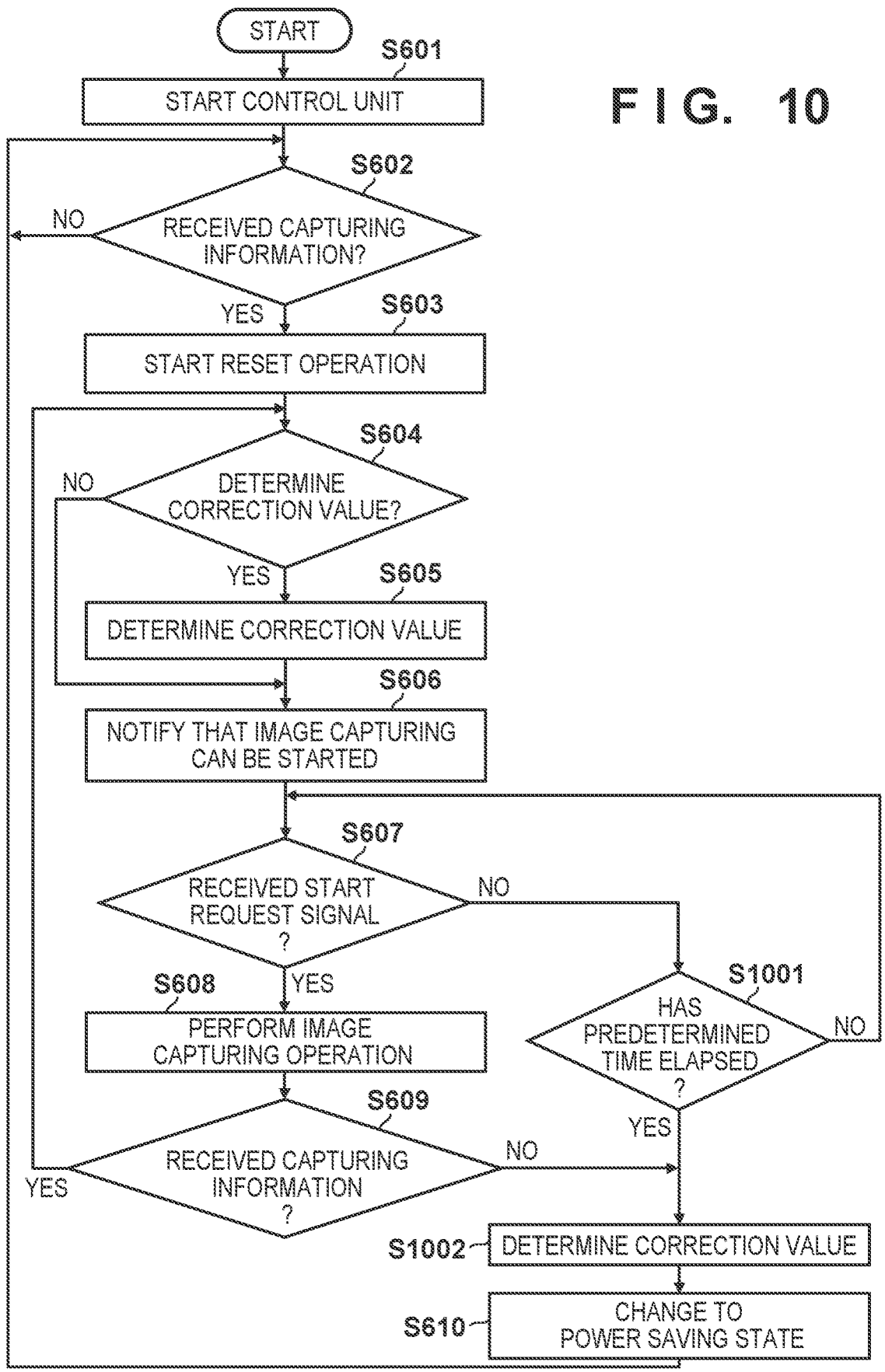
FIG. 10 is a flowchart showing operations of a radiation imaging apparatus according to a second embodiment.

An exemplary operation of the radiation imaging apparatus 100 will be described with reference to FIG. 10. This operation is executed by the control unit 180 in a similar manner to the operation in FIG. 6. Steps S601 to S610 may be similar to the operation in FIG. 6, and thus a redundant description is omitted.

If it is determined in step S607 that the control unit 180 has not received a start request signal (NO in step S607), the procedure transitions to step S1001. In step S1001, the control unit 180 determines whether or not a predetermined time (for example, 5 minutes) has elapsed from when image capturing information was received in step S602. If the predetermined time has elapsed (YES in step S1001), the procedure transitions to step S1002, otherwise (NO in step S1101), the procedure transitions to step S607.

In step S1002, the control unit 180 executes a correction value determination operation similarly to step S605. Subsequently, the control unit 180 transitions to the power saving state in step S610, then returns to step S602, and waits until image capturing information is newly received. Since the state has transitioned to the power saving state, the reset operation ends. In this manner, if image capturing is not started when the predetermined time has elapsed from when the image capturing information was received, it is estimated that image capturing will not be performed for a while. For this reason, by executing the correction value determination operation at this time point before the radiation imaging apparatus 100 transitions to the power saving state, the correction value determination operation can be executed at a timing when image capturing is less affected. In addition, in the subsequent step S604, it is possible to suppress the frequency at which it is determined that the correction value determination operation is to be executed.

If it is determined in step S609 that the control unit 180 has not received image capturing information (NO in step S609), the procedure transitions to step S1002. Also in this case, the control unit 180 executes the correction value determination operation before the radiation imaging apparatus 100 transitions to the power saving state. Similarly to the above, by executing the correction value determination operation at this time point, the correction value determination operation can be executed at a timing when the next image capturing is less affected. In addition, it is possible to suppress the frequency at which it is determined in step S604 that the correction value determination operation is to be executed.

Third Embodiment

A radiation imaging apparatus according to a third embodiment will be described. The hardware configuration of the radiation imaging apparatus according to the third embodiment may be similar to that in the first embodiment. Thus, the radiation imaging apparatus according to the third embodiment is also referred to as the "radiation imaging apparatus 100". Operations of the radiation imaging apparatus 100 according to the third embodiment are different from those in the first embodiment. The third embodiment may be similar to the first embodiment except for that, and thus a redundant description is omitted. Differences from the first embodiment will be described below, but the same change can be made in the second embodiment.

Figure 11:
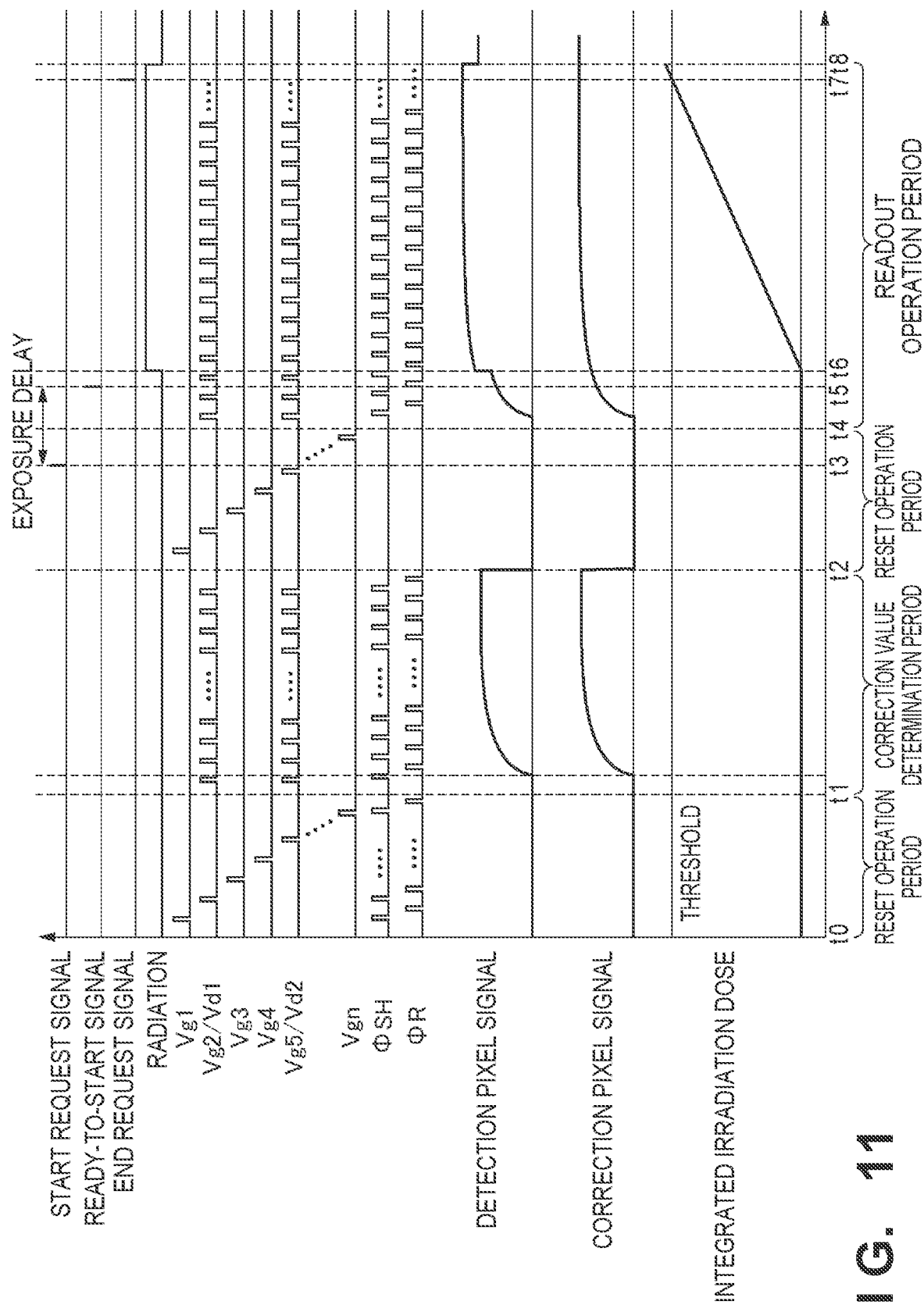
FIG. 11 is a timing diagram showing operations of a radiation imaging apparatus according to a third embodiment.

An exemplary operation of the radiation imaging apparatus 100 if it is determined in step S604 in FIG. 6 that the correction value determination operation is to be executed will be described with reference to FIG. 11. FIG. 11 is different from FIG. 6 in that, while the reset operation is executed at t0 to t1, the control unit 180 does not only reset the image capturing pixels 101, but also reads out signals (offset output) from the image capturing pixels 101. FIG. 11 may be similar to FIG. 6 except for that. The image capturing pixels 101, the detection pixel 104, and the correction pixel 107 have the same structure, and thus offset output of a readout operation of the image capturing pixels 101 and offset output of the detection pixel 104 and the correction pixel 107 during the radiation dose determination operation are highly correlated. In view of this, in this embodiment, the control unit 180 determines whether or not to execute the correction value determination operation, using the offset output of a readout operation of the image capturing pixels 101.

As shown in FIG. 11, the control unit 180 obtains offset output of the image capturing pixels 101, during a period of a portion of repeated reset operations (for example, t0 to t1). In the determination in step S603, the control unit 180 estimates the correction values Od and Oc based on offset output of the image capturing pixels 101, and determines whether or not to execute the correction value determination operation, based on the estimated correction values. The correction between offset output of the image capturing pixels 101 and offset output of the detection pixel 104 and the correction pixel 107 may be stored in the storage unit 172, for example. The control unit 180 may estimate offset output of the detection pixel 104 and the correction pixel 107 based on this correlation and the offset output of the image capturing pixels 101, and specify the estimated values as the correction values Od and Oc.

The control unit 180 may obtain and store this correlation at the time of shipment or installation of the radiation imaging apparatus 100, or may update this relation every time offset output of the detection pixel 104 and the correction pixel 107 are obtained at the time of executing the correction value determination operation. By updating this relation in this manner, it is possible to accurately infer correction values and perform determination even when offset output of a pixel changes over time or due to drive history.

The determination criteria may include an estimated correction value being out of a predetermined range (for example, being different by 2% or more) with respect to a correction value determined by executing the correction value determination operation in the past (for example, lastly). When an estimated correction value is out of the predetermined range with respect to a correction value determined in the past, it is conceivable that the accuracy of the estimated correction value is low, and thus the control unit 180 may newly execute the correction value determination operation. When an estimated correction value is within the predetermined range with respect to a correction value determined in the past, the control unit 180 may execute the radiation dose determination operation in step S608 using the estimated correction value, without newly executing the correction value determination operation.

Fourth Embodiment

A radiation imaging apparatus according to a fourth embodiment will be described. The hardware configuration of the radiation imaging apparatus according to the fourth embodiment may be similar to that of the first embodiment. Thus, the radiation imaging apparatus according to the fourth embodiment is also referred to as the "radiation imaging apparatus 100". Operations of the radiation imaging apparatus 100 according to the fourth embodiment are different from those of the first embodiment. The fourth embodiment may be similar to the first embodiment except for that, and thus a redundant description is omitted. Differences from the first embodiment will be described below, but the same change can be made in the second embodiment or the third embodiment.

When the reset operation ends at time t1 in FIG. 7, the control unit 180 holds, to the sample hold circuit SH, a signal that is based on the potential of a signal line 120 by temporarily raising the control signal φSH to the high level without supplying a drive signal to the detection pixel 104 and the correction pixel 107. The control unit 180 then resets the read-out circuit 160 by temporarily raising the control signal φR to the high level. This operation is referred to as an "obtaining operation".

The control unit 180 then temporarily supplies a drive signal to the detection pixel 104 and the correction pixel 107, and then temporarily raises the control signal φSH to the high level, thereby holding a signal read from a signal line 120, to the sample hold circuit SH. The control unit 180 then resets the read-out circuit 160 by temporarily raising the control signal φR to the high level. This operation is referred to as a "readout operation". This readout operation is similar to the readout operation according to the first embodiment. The control unit 180 alternately executes the obtaining operation and the readout operation in a repeated manner.

After the reset operation has ended, the control unit 180 performs the obtaining operation and the readout operation a predetermined number of times, that is once or more. The signal processing unit 170 determines a correction value Od1 that is based on a signal obtained in the obtaining operation regarding the signal line 120 to which the detection pixel 104 is connected and a correction value Oc1 that is based on a signal obtained in the obtaining operation regarding the signal line 120 to which the correction pixel 107 is connected. Furthermore, the signal processing unit 170 determines a correction value Od2 that is based on signals read out from the detection pixel 104 in the readout operation performed the predetermined number of times and a correction value Oc2 that is based on signals read out from the correction pixel 107 in this readout operation performed the predetermined number of times. The correction values Od1 and Oc1 can be determined similarly to the above correction values Od and Oc. In addition, the correction values Od2 and Oc2 are values similar to the above correction values Od and Oc.

At time t4, the control unit 180 repeatedly executes the above-described obtaining operation and readout operation. The signal processing unit 170 measures the irradiation dose DOSE for each readout operation, and determines whether or not the integration value thereof exceeds a threshold.

A method for determining the irradiation dose DOSE will be described below. The value of a signal obtained in the last obtaining operation regarding the signal line 120 to which the detection pixel 104 is connected is indicated by Sd1. The value of a signal obtained in the last obtaining operation regarding the signal line 120 to which the correction pixel 107 is connected is indicated by Sc1. The value of a signal read out from the detection pixel 104 in the last readout operation is indicated by Sd2. The value of a signal read out from the correction pixel 107 in the last readout operation is indicated by Sc2. Sd2 and Sc2 are values similar to Sd and Sc above. The signal processing unit 170 calculates DOSE by applying Sd1, Sc1, Od1, Oc1, Sd2, Sc2, Od2, and Oc2 to Expression 3 below.

$$DOSE = \{(Sd2-Od2)-(Sd1-Od1)\}-\{(Sc2-Oc2)-(Sc1-Oc1)\} \quad \text{Expression 3}$$

In this expression, DOSE is determined based on the difference between the value Sc1 of a signal read out from the correction pixel 107 after a ready-to-start signal was transmitted and the correction value Oc1 determined based on a signal read out from the correction pixel 107 before a ready-to-start signal is transmitted.

In addition, the signal processing unit 170 may calculate DOSE by applying Sd1, Sc1, Od1, Oc1, Sd2, Sc2, Od2, and Oc2 to Expression 4 below in place of Expression 3.

$$\text{DOSE}=(Sd2-Sd1)-(Od2-Od1)\times(Sc2-Sc1)/(Oc2-Oc1) \quad \text{Expression 4}$$

In this expression, DOSE is determined based on the ratio of the value Sc1 of a signal read out from the correction pixel 107 after a ready-to-start signal was transmitted to the correction value Oc1 determined based on a signal read out from the correction pixel 107 before the ready-to-start signal is transmitted. Other operations may be similar to those of the first embodiment, and thus a redundant description is omitted.

Effects of this embodiment will be described below. Parasitic capacitance is generated between one signal line 120 and the electrode of a conversion element included in a pixel connected thereto. Due to this parasitic capacitance, the signal line 120 and the electrode of the conversion element are capacitively coupled, and crosstalk may occur. For this reason, when the potential of the electrode of the conversion element of a pixel in one row changes due to photoelectric conversion while a signal is read out from the conversion element of a pixel in another row via the signal line 120, the potential of the signal line 120 may change due to crosstalk. This change can cause a reduction in the accuracy in determination of an irradiation dose.

In the above-described obtaining operation, a signal that is based on the potential of a signal line 120 is obtained in a state where the switch element is not electrically connected, and thus a signal that represents only crosstalk can be extracted. In the above-described readout operation, a signal is read out after the switch element is electrically connected, and it is possible to read out a signal that is a combination of a signal stored in a conversion element and crosstalk. If a period of time from when the potential of a signal line 120 is reset until when sampling is performed is the same in the obtaining operation and the readout operation, the amount of crosstalk is about the same, and thus crosstalk can be corrected by taking the difference therebetween. Furthermore, an offset component can be corrected using Expressions 3 and 4 above similarly to the first embodiment.

Fifth Embodiment

A radiation imaging apparatus according to a fifth embodiment will be described. The hardware configuration of the radiation imaging apparatus according to the fifth embodiment may be similar to that in the first embodiment. Thus, the radiation imaging apparatus according to the fifth embodiment is also referred to as the "radiation imaging apparatus 100". Operations of the radiation imaging apparatus 100 according to the fifth embodiment are different from those of the first embodiment. The fifth embodiment may be similar to the first embodiment except for that, and thus a redundant description is omitted. Differences from the first embodiment will be described below, but the same change can be made in the second embodiment or the third embodiment.

In the readout operation, the control unit 180 maintains a state of a drive signal being supplied to the detection pixel 104 and the correction pixel 107 via the detection drive lines 111. Therefore, the switch elements of the detection pixel 104 and the correction pixel 107 are kept on. The control unit 180 determines the above dose of radiation that is being emitted while maintaining this state. Specifically, the control unit 180 holds, to the sample hold circuit SH, a signal read out from a pixel through a signal line 120 by the read-out circuit 160, by temporarily raising the control signal φSH to the high level. The control unit 180 then resets the read-out circuit 160 (specifically, the differential amplifier circuit AMP of the amplification unit 161), by temporarily raising the control signal φR to the high level. Other operations may be similar to those in the first embodiment, and thus a redundant description is omitted.

In the above embodiment, the irradiation dose DOSE is determined using Sd, Sc, Od, and Oc. Instead, the irradiation dose DOSE may also be determined using Sd and Od without using Sc and Oc. In this case, in the correction value determination operation and the radiation dose determination operation, a signal does not need to be read out from the correction pixel 107. In addition, in the radiation imaging apparatus 100, the correction pixel 107 may be omitted.

Sixth Embodiment

A radiation imaging apparatus according to a sixth embodiment will be described. The hardware configuration of the radiation imaging apparatus according to the sixth embodiment may be similar to those in the first embodiment and the second embodiment. Thus, the radiation imaging apparatus according to the sixth embodiment is also referred to as the "radiation imaging apparatus 100". Operations of the radiation imaging apparatus 100 according to the sixth embodiment are different from those in the first embodiment and the second embodiment. The sixth embodiment may be similar to the first embodiment and the second embodiment except for that, and thus a redundant description is omitted. Differences from the second embodiment will be described below.

Figure 12:
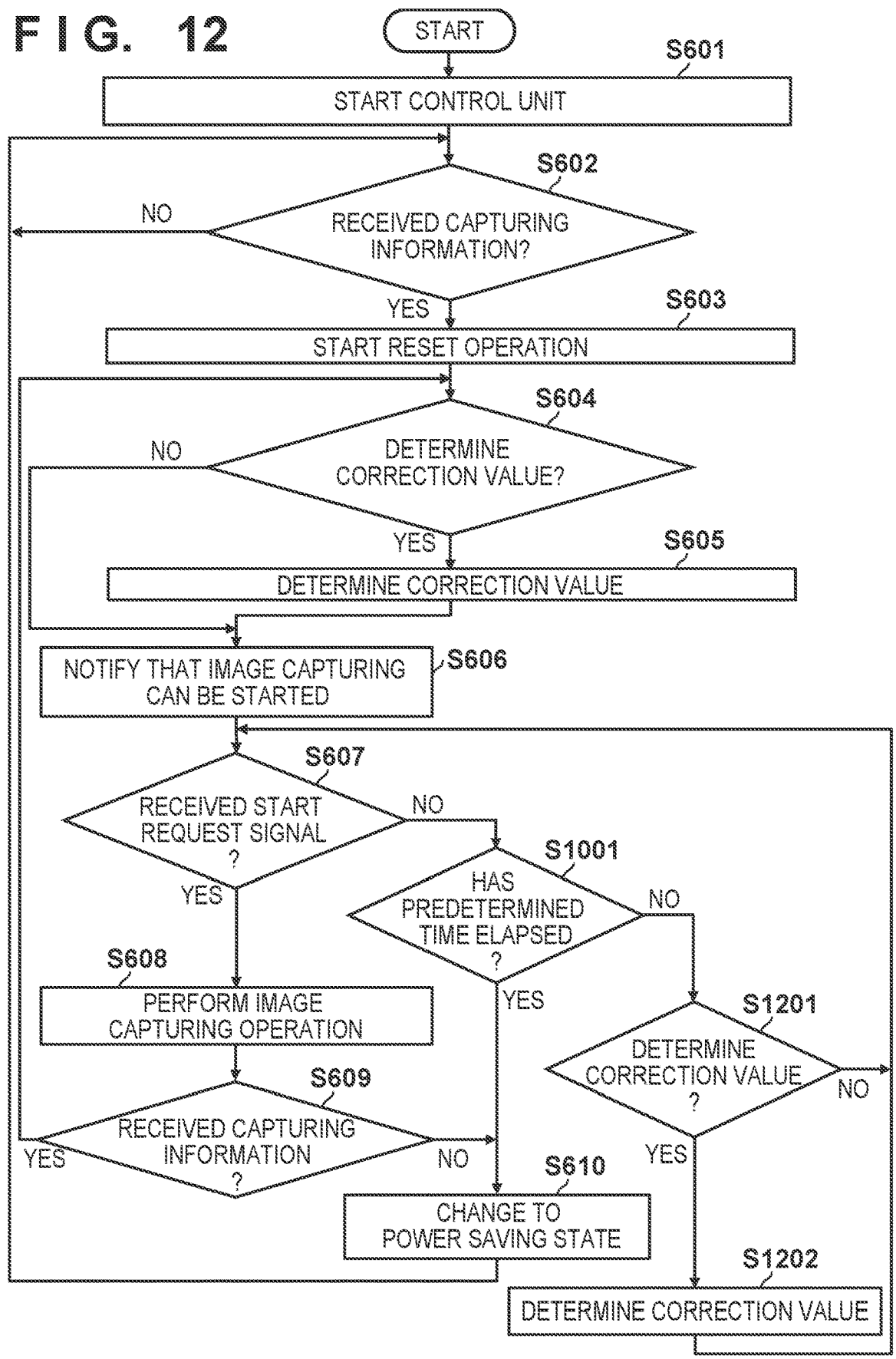
FIG. 12 is a flowchart showing operations of a radiation imaging apparatus according to a sixth embodiment.
Figure 13:
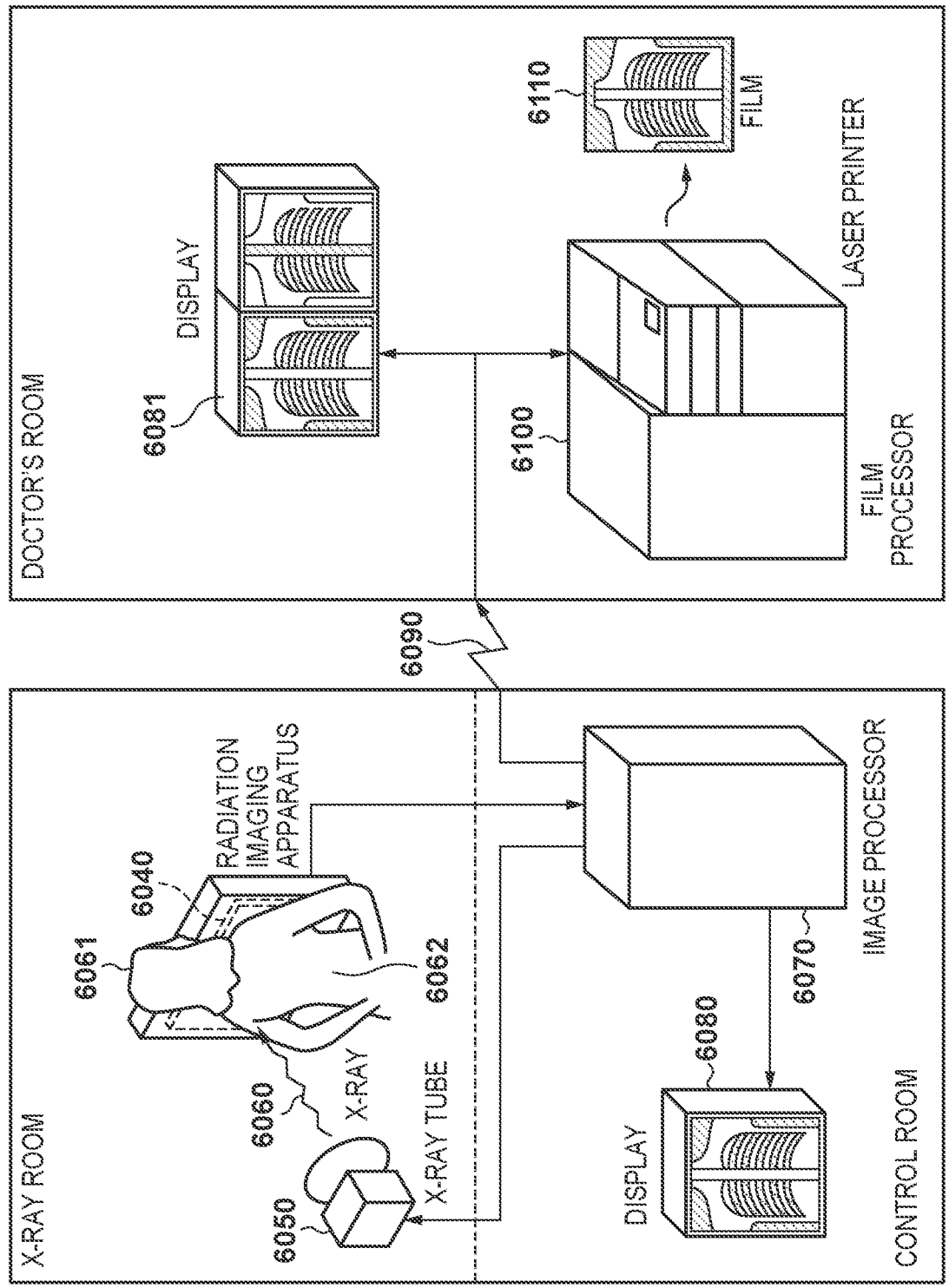
FIG. 13 is a diagram showing a configuration example of a radiation imaging system.

An exemplary operation of the radiation imaging apparatus 100 will be described with reference to FIG. 12. This operation is executed by the control unit 180 similarly to the operation in FIG. 10. Steps S601 to S610, and S1001 may be similar to the operation in FIG. 10, and thus a redundant description is omitted.

In step S607, during standby for receiving a start request signal, if it is determined in step S1001 that the predetermined time has not elapsed (NO in step S1001), the procedure transitions to step S1201. In step S1201, determination is performed as to whether or not to execute the correction value determination operation, and if it is determined that the correction value determination operation is to be executed (YES in step S1201), the procedure transitions to step S1202, where the correction value determination operation is executed. The procedure then transitions to step S607. If it is determined that the correction value determination operation is not to be executed (NO in step S1201), the procedure transitions to step S607 without transitioning to step S1202. By obtaining a correction value during standby for receiving a start request signal in this manner, even when offset output changes during standby for receiving a start request signal, correction can be accurately performed.

In addition, if it is determined in step S609 that image capturing information has been received (YES in step S609), the procedure transitions to step S606 without performing the correction value determination operation in step S605, and transition can be made to the state where image capturing can be performed.

Note that image capturing can be performed during standby for receiving a start request signal in step S607, and thus, when a start request signal is received while the correction value determination operation in step S1202 is being performed, it is also possible to stop the correction value determination operation in step S1202 and transition to the image capturing operation in step S608. In addition, the correction value determination operation in step S1202 can be performed in a separated manner as in FIG. 9, for example. By performing the operation in separate manner, transition can be promptly made to the image capturing operation in step S608 when a start request signal is received, while determining a correction value in a short time to improve the accuracy. The determination criteria of the correction value determination operation in step S1202 may be stricter than the criterion for the determination in step S604. By increasing the frequency of the correction value determination operation in step S1202, when image capturing information is received in step S602 after transition is made to the power saving state in step S610, it is possible to suppress the frequency of the correction value determination operation in step S605. Accordingly, it is possible to shorten a period of time from when image capturing information is received in step S602 until when transition is made to a state where image capturing can be performed in step S606.

Other Embodiment

An example in which the radiation imaging apparatus 100 is applied to a radiation detection system will be described below with reference to FIG. 12. An X-ray 6060 generated by an X-ray tube 6050 that is a radiation source passes through a chest 6062 of a patient or a subject 6061, and is incident to a radiation imaging apparatus 6040 represented by the above-described radiation imaging apparatus 100. This incident X-ray includes information regarding an internal body part of the subject 6061. A scintillator emits light in correspondence with the X-ray being incident, and the light is photoelectrically converted by photoelectric conversion elements, and electrical information is obtained. This information is converted into digital, and is subjected image processing performed by an image processor 6070 that is a signal processing unit, and is observed on a display 6080 that is a display unit of a control chamber.

In addition, this information can be transferred to a remote location using a transmission processing unit such as a phone line 6090, and can be displayed on a display 6081 that is a display unit in a doctor's room or the like at a different location or stored in a recording unit such as an optical disk, and a medical practitioner at a remote location can make a diagnosis using the information. Also, this information can be recorded on a film 6110 that is a recording medium by a film processor 6100 that is a recording unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-069264, filed Apr. 15, 2021, which is hereby incorporated by reference herein in its entirety.

What is claimed is:

1. A radiation imaging apparatus configured to perform an image capturing, comprising:
   a plurality of first type pixels that include a predetermined pixel; and
   a one or more controllers configured to execute:
   a correction value determination operation of reading out a signal from the predetermined pixel once or more in a state where radiation is not emitted onto the radiation imaging apparatus, and determining a correction value that is based on the signal read out from the predetermined pixel, and
   a radiation dose determination operation of reading out a signal from the predetermined pixel while radiation is emitted onto the radiation imaging apparatus, and determining a dose of radiation that is being emitted, using a value of the signal read out from the predetermined pixel and the correction value, wherein
   the controller determines whether or not to execute the correction value determination operation in a case where communication information that causes the preparation of the image capturing is received,
   the controller executes the correction value determination operation and executes the radiation dose determination operation using the correction value determined in the correction value determination operation in a case where it is determined that the correction value determination operation is to be executed and then it is determined that the image capturing is to be executed, and
   the controller executes the radiation dose determination operation using a predetermined correction value without executing the correction value determination operation in a case where it is determined that the correction value determination operation is not to be executed, and then it is determined that the image capturing is to be executed.

2. The radiation imaging apparatus according to claim 1, wherein the communication information is image capturing information for the image capturing.

3. The radiation imaging apparatus according to claim 1, wherein the controller executes the correction value determination operation before the radiation imaging apparatus transitions to a power saving state.

4. The radiation imaging apparatus according to claim 1, wherein the controller executes the correction value determination operation when image capturing that uses image capturing information is not started after a predetermined time has elapsed from when the image capturing information was received from an external apparatus.

5. The radiation imaging apparatus according to claim 1, wherein a determination criterion for the controller to determine that the correction value determination operation is to be executed includes a criterion regarding a time that has lapsed from when the correction value determination operation was lastly executed.

6. The radiation imaging apparatus according to claim 1, wherein a determination criterion for the controller to determine that the correction value determination operation is to be executed includes a criterion regarding an internal temperature of the radiation imaging apparatus.

7. The radiation imaging apparatus according to claim 1, wherein a determination criterion for the controller to determine that the correction value determination operation is to be executed includes a criterion regarding an offset output of the predetermined pixel, and
   the offset output of a pixel refers to a signal read out from that pixel in a state where radiation is not emitted onto the radiation imaging apparatus.

8. The radiation imaging apparatus according to claim 1, further comprising:
   a storage unit; and
   a plurality of second type pixels configured to generate pixel values for forming a radiation image, wherein
   the controller estimates the correction value based on an offset output of the second type pixels and a correlation between the offset output of the second type pixels and an offset output of the predetermined pixel that is stored in the storage unit, wherein the offset output of a pixel refers to a signal read out from that pixel in a state where radiation is not emitted onto the radiation imaging apparatus, and the controller determines whether or not to execute the correction value determination operation based on the estimated correction value.

9. The radiation imaging apparatus according to claim 8, wherein in a case where it is determined that the correction value determination operation is not to be executed, the controller uses the estimated correction value as the predetermined correction value.

10. The radiation imaging apparatus according to claim 1, further comprising a plurality of third type pixels that include another predetermined pixel having lower sensitivity to radiation than the predetermined pixel, wherein the correction value is a first correction value, and in the correction value determination operation the controller reads out a signal from the another predetermined pixel once or more in a state where radiation is not emitted onto the radiation imaging apparatus and further determines a second correction value that is based on the signal read out from the another predetermined pixel, and in the radiation dose determination operation the controller reads out signals from the predetermined pixel and the another predetermined pixel while radiation is emitted onto the radiation imaging apparatus, and determines a dose of radiation that is being emitted, using a value of the signal read out from the predetermined pixel, a value of the signal read out from the another predetermined pixel, the first correction value, and the second correction value.

11. A radiation imaging system comprising:
the radiation imaging apparatus according to claim 1, and
a signal processing apparatus configured to process a signal from the radiation imaging apparatus.

12. The radiation imaging apparatus according to claim 1, wherein charges stored in the plurality of first type pixels are reset in the preparation.

13. The radiation imaging apparatus according to claim 1, wherein the controllers use a pre-stored correction value as the predetermined correction value when it is determined that the correction value determination operation is not to be executed.

14. The radiation imaging apparatus according to claim 13, wherein the pre-stored correction values are correction values acquired in a previously executed correction value determination operation.

15. The radiation imaging apparatus according to claim 1, wherein the controller determines at the first timing whether or not to execute the correction value determination operation in a case where communication information that causes the preparation of the image capturing is received, and the controller determines at the second timing whether or not to execute the correction value determination operation in a case where a predetermined condition is satisfied after the preparation.

* * * * *